(12) United States Patent
Laroia et al.

(10) Patent No.: US 10,191,356 B2
(45) Date of Patent: Jan. 29, 2019

(54) METHODS AND APPARATUS RELATING TO DETECTION AND/OR INDICATING A DIRTY LENS CONDITION

(71) Applicant: LIGHT LABS INC., Palo Alto, CA (US)

(72) Inventors: Rajiv Laroia, Far Hills, NJ (US); Sapna A. Shroff, Sunnyvale, CA (US)

(73) Assignee: Light Labs Inc., Palo Alto, CA (US)

( * ) Notice: Subject to any disclaimer, the term of this patent is extended or adjusted under 35 U.S.C. 154(b) by 0 days.

(21) Appl. No.: 14/791,369

(22) Filed: Jul. 3, 2015

(65) Prior Publication Data

US 2016/0004144 A1 Jan. 7, 2016

Related U.S. Application Data

(60) Provisional application No. 62/021,097, filed on Jul. 4, 2014.

(51) Int. Cl.
   *H04N 5/225* (2006.01)
   *G03B 17/18* (2006.01)
   (Continued)

(52) U.S. Cl.
   CPC ......... *G03B 17/18* (2013.01); *G02B 27/0006* (2013.01); *G03B 17/02* (2013.01);
   (Continued)

(58) Field of Classification Search
   CPC ..... G03B 17/18; G02B 27/0006; H04N 5/225
   (Continued)

(56) References Cited

U.S. PATENT DOCUMENTS 4,427,888 A * 1/1984 Galvin .................. G02B 23/12
                                                        250/330
4,890,133 A   12/1989 Ogawa et al.
(Continued)

FOREIGN PATENT DOCUMENTS

EP    2642757 A2   9/2013
JP    10091765     4/1998
(Continued)

OTHER PUBLICATIONS

International Search Report and Written Opinion of the International Searching Authority from International Application No. PCT/US15/39161, pp. 1-7, dated Oct. 29, 2015.
(Continued)

*Primary Examiner* — Yogesh Aggarwal
(74) *Attorney, Agent, or Firm* — Straub & Straub; Michael P. Straub; Stephen T. Straub

(57) ABSTRACT

The present application relates to image capture and generation methods and apparatus and, more particularly, to methods and apparatus which detect and/or indicate a dirty lens condition. One embodiment of the present invention includes a method of operating a camera including the steps of capturing a first image using a first lens of the camera; determining, based on at least the first image, if a dirty camera lens condition exists; and in response to determining that a dirty lens condition exists, generating a dirty lens condition notification or initiating an automatic camera lens cleaning operation. In some embodiments multiple captured images with overlapping image regions are compared to determine if a dirty lens condition exists.

20 Claims, 9 Drawing Sheets

(51) Int. Cl.
- *G02B 27/00* (2006.01)
- *G03B 17/02* (2006.01)
- *H04N 5/355* (2011.01)
- *H04N 5/217* (2011.01)
- *H04N 5/232* (2006.01)

(52) U.S. Cl.
CPC ......... *H04N 5/2171* (2013.01); *H04N 5/2258* (2013.01); *H04N 5/232* (2013.01); *H04N 5/35563* (2013.01); *H04N 5/35581* (2013.01)

(58) Field of Classification Search
USPC .............................................. 348/220.1–248
See application file for complete search history.

(56) References Cited

U.S. PATENT DOCUMENTS

| | | |
|---|---|---|
| 5,078,479 A | 1/1992 | Vuilleumier |
| 5,153,569 A | 10/1992 | Kawamuraa et al. |
| 5,353,068 A | 10/1994 | Moriwake |
| 5,583,602 A | 12/1996 | Yamamoto |
| 5,781,331 A | 7/1998 | Carr et al. |
| 5,889,553 A | 3/1999 | Kino et al. |
| 5,975,710 A | 11/1999 | Luster |
| 5,982,951 A | 11/1999 | Katayama et al. |
| 6,011,661 A | 1/2000 | Weng |
| 6,028,600 A | 2/2000 | Rosin et al. |
| 6,081,670 A | 6/2000 | Madsen et al. |
| 6,141,034 A | 10/2000 | McCutchen |
| 6,255,651 B1 | 7/2001 | Laluvein et al. |
| 7,009,652 B1 | 3/2006 | Tanida et al. |
| 7,280,735 B2 | 10/2007 | Thibault |
| 7,315,423 B2 | 1/2008 | Sato |
| 7,551,358 B2 | 6/2009 | Lee et al. |
| 7,561,201 B2 | 7/2009 | Hong |
| 7,801,428 B2 | 9/2010 | Nagaishi et al. |
| 7,810,511 B2 | 10/2010 | Fagrenius et al. |
| 8,144,230 B2 | 3/2012 | Watanabe et al. |
| 8,194,169 B2 | 6/2012 | Tamaki et al. |
| 8,199,222 B2 | 6/2012 | Drimbarean et al. |
| 8,237,841 B2 | 8/2012 | Tanida et al. |
| 8,320,051 B2 | 11/2012 | Matsumura et al. |
| 8,417,058 B2 | 4/2013 | Tardif |
| 8,482,637 B2 | 7/2013 | Ohara et al. |
| 8,520,022 B1 | 8/2013 | Cohen et al. |
| 8,553,106 B2 | 10/2013 | Scarff |
| 8,619,082 B1 | 12/2013 | Cuirea et al. |
| 8,639,296 B2 | 1/2014 | Ahn et al. |
| 8,665,341 B2 | 3/2014 | Georgiev et al. |
| 8,704,944 B1 | 4/2014 | Wierzoch et al. |
| 8,762,895 B2 | 6/2014 | Mehta et al. |
| 8,780,258 B2 | 7/2014 | Lee |
| 8,896,655 B2 | 11/2014 | Mauchly et al. |
| 8,970,765 B2 | 3/2015 | Higashimoto |
| 9,041,826 B2 | 5/2015 | Jung et al. |
| 9,104,705 B2 | 8/2015 | Fujinaga |
| 9,135,732 B2 | 9/2015 | Winn et al. |
| 9,282,228 B2 | 3/2016 | Laroia |
| 9,374,514 B2 | 6/2016 | Laroia |
| 2002/0149691 A1 | 10/2002 | Pereira et al. |
| 2003/0018427 A1 | 1/2003 | Yokota et al. |
| 2003/0020814 A1 | 1/2003 | Ono |
| 2003/0185551 A1 | 10/2003 | Chen |
| 2003/0193604 A1 | 10/2003 | Robins et al. |
| 2004/0100479 A1 | 5/2004 | Nakano et al. |
| 2004/0227839 A1 | 11/2004 | Stavley et al. |
| 2005/0088546 A1 | 4/2005 | Wang |
| 2005/0200012 A1 | 9/2005 | Kinsman |
| 2006/0067672 A1 | 3/2006 | Washisu et al. |
| 2006/0187338 A1 | 8/2006 | May et al. |
| 2006/0221218 A1 | 10/2006 | Adler et al. |
| 2006/0238886 A1 | 10/2006 | Kushida et al. |
| 2006/0281453 A1 | 12/2006 | Jaiswal et al. |
| 2007/0050139 A1 | 3/2007 | Sidman |
| 2007/0065012 A1 | 3/2007 | Yamakado et al. |
| 2007/0127915 A1 | 6/2007 | Lu et al. |
| 2007/0177047 A1 | 8/2007 | Goto |
| 2007/0182528 A1 | 8/2007 | Breed et al. |
| 2008/0030592 A1 | 2/2008 | Border et al. |
| 2008/0074755 A1 | 3/2008 | Smith |
| 2008/0084484 A1 | 4/2008 | Ochi et al. |
| 2008/0111881 A1 | 5/2008 | Gibbs et al. |
| 2008/0180562 A1 | 7/2008 | Kobayashi |
| 2008/0211941 A1 | 9/2008 | Deever et al. |
| 2008/0219654 A1 | 9/2008 | Border et al. |
| 2008/0240698 A1 | 10/2008 | Bartilson et al. |
| 2008/0247745 A1 | 10/2008 | Nilsson |
| 2008/0251697 A1 | 10/2008 | Park et al. |
| 2008/0278610 A1 | 11/2008 | Boettiger |
| 2009/0059037 A1 | 3/2009 | Naick et al. |
| 2009/0086032 A1 | 4/2009 | Li |
| 2009/0136223 A1 | 5/2009 | Motomura et al. |
| 2009/0154821 A1 | 6/2009 | Sorek et al. |
| 2009/0225203 A1 | 9/2009 | Tanida et al. |
| 2009/0278950 A1 | 11/2009 | Deng et al. |
| 2009/0290042 A1 | 11/2009 | Shiohara |
| 2010/0013906 A1 | 1/2010 | Border et al. |
| 2010/0034531 A1 | 2/2010 | Go |
| 2010/0045774 A1 | 2/2010 | Len et al. |
| 2010/0053414 A1 | 3/2010 | Tamaki et al. |
| 2010/0079635 A1 | 4/2010 | Yano et al. |
| 2010/0091089 A1 | 4/2010 | Cromwell et al. |
| 2010/0097443 A1 | 4/2010 | Lablans |
| 2010/0225755 A1 | 9/2010 | Tamaki et al. |
| 2010/0238327 A1 | 9/2010 | Griffith et al. |
| 2010/0265346 A1 | 10/2010 | Iizuka |
| 2010/0283842 A1 | 11/2010 | Guissin et al. |
| 2010/0296802 A1 | 11/2010 | Davies |
| 2011/0051243 A1 | 3/2011 | Su |
| 2011/0063325 A1 | 3/2011 | Saunders |
| 2011/0069189 A1 | 3/2011 | Venkataraman et al. |
| 2011/0080655 A1 | 4/2011 | Mori |
| 2011/0123115 A1 | 5/2011 | Lee et al. |
| 2011/0128393 A1 | 6/2011 | Tavi et al. |
| 2011/0157430 A1 | 6/2011 | Hosoya et al. |
| 2011/0157451 A1 | 6/2011 | Chang |
| 2011/0187878 A1 | 8/2011 | Mor et al. |
| 2011/0193984 A1 | 8/2011 | Kitaya et al. |
| 2011/0221920 A1* | 9/2011 | Gwak ................. H04N 5/23293 348/222.1 |
| 2011/0222167 A1 | 9/2011 | Iwasawa |
| 2011/0242342 A1 | 10/2011 | Goma et al. |
| 2011/0280565 A1 | 11/2011 | Chapman et al. |
| 2011/0285895 A1 | 11/2011 | Weng et al. |
| 2012/0002096 A1 | 1/2012 | Choi et al. |
| 2012/0013708 A1 | 1/2012 | Okubo |
| 2012/0033069 A1 | 2/2012 | Becker et al. |
| 2012/0062691 A1 | 3/2012 | Fowler et al. |
| 2012/0155848 A1 | 6/2012 | Labowicz et al. |
| 2012/0162464 A1 | 6/2012 | Kim |
| 2012/0188391 A1 | 7/2012 | Smith |
| 2012/0207462 A1 | 8/2012 | Justice |
| 2012/0212651 A1 | 8/2012 | Sawada |
| 2012/0242881 A1 | 9/2012 | Suzuki |
| 2012/0249815 A1 | 10/2012 | Bohn et al. |
| 2012/0257013 A1 | 10/2012 | Witt et al. |
| 2012/0257077 A1 | 10/2012 | Suzuki |
| 2012/0268642 A1 | 10/2012 | Kawai |
| 2013/0027353 A1 | 1/2013 | Hyun |
| 2013/0050564 A1 | 2/2013 | Adams, Jr. et al. |
| 2013/0057743 A1 | 3/2013 | Minagawa et al. |
| 2013/0064531 A1 | 3/2013 | Pillman et al. |
| 2013/0076928 A1 | 3/2013 | Olsen et al. |
| 2013/0086765 A1 | 4/2013 | Chen |
| 2013/0088614 A1 | 4/2013 | Lee |
| 2013/0093842 A1 | 4/2013 | Yahata |
| 2013/0093947 A1 | 4/2013 | Lee et al. |
| 2013/0100272 A1 | 4/2013 | Price et al. |
| 2013/0153772 A1 | 6/2013 | Rossi et al. |
| 2013/0155194 A1 | 6/2013 | Sacre et al. |
| 2013/0194475 A1 | 8/2013 | Okamoto |
| 2013/0222676 A1 | 8/2013 | Ono |
| 2013/0223759 A1 | 8/2013 | Nishiyama |
| 2013/0250125 A1 | 9/2013 | Garrow et al. |

(56) References Cited

U.S. PATENT DOCUMENTS

| | | |
|---|---|---|
| 2013/0258044 A1 | 10/2013 | Betts-Lacroix |
| 2013/0300869 A1 | 11/2013 | Lu et al. |
| 2014/0049677 A1 | 2/2014 | Kawaguchi |
| 2014/0063018 A1 | 3/2014 | Takeshita |
| 2014/0111650 A1 | 4/2014 | Georgiev et al. |
| 2014/0152802 A1 | 6/2014 | Olsson et al. |
| 2014/0192214 A1 | 7/2014 | Laroia |
| 2014/0192224 A1 | 7/2014 | Laroia |
| 2014/0192225 A1 | 7/2014 | Laroia |
| 2014/0192240 A1 | 7/2014 | Laroia |
| 2014/0192253 A1 | 7/2014 | Laroia |
| 2014/0204244 A1 | 7/2014 | Choi et al. |
| 2014/0226041 A1 | 8/2014 | Eguchi et al. |
| 2014/0267243 A1 | 9/2014 | Venkataraman et al. |
| 2014/0293079 A1* | 10/2014 | Milanfar ............... H04N 5/2171 348/222.1 |
| 2014/0354714 A1 | 12/2014 | Hirschler et al. |
| 2015/0035824 A1 | 2/2015 | Takahashi et al. |
| 2015/0043808 A1 | 2/2015 | Takahashi et al. |
| 2015/0049233 A1 | 2/2015 | Choi |
| 2015/0154449 A1 | 6/2015 | Ito et al. |
| 2015/0156399 A1 | 6/2015 | Chen et al. |
| 2015/0163400 A1* | 6/2015 | Geiss ............... H04N 5/23229 348/231.99 |
| 2015/0234149 A1 | 8/2015 | Kreitzer et al. |
| 2015/0253647 A1 | 9/2015 | Mercado |
| 2015/0279012 A1 | 10/2015 | Brown et al. |
| 2016/0142610 A1 | 5/2016 | Rivard et al. |
| 2016/0165101 A1 | 6/2016 | Akiyama et al. |
| 2017/0180615 A1 | 6/2017 | Lautenbach |
| 2017/0180637 A1 | 6/2017 | Lautenbach et al. |

FOREIGN PATENT DOCUMENTS

| | | |
|---|---|---|
| JP | 2001061109 | 3/2001 |
| JP | 2007164258 | 6/2004 |
| JP | 2004289214 | 10/2004 |
| JP | 2006106230 | 4/2006 |
| JP | 2007201915 | 8/2007 |
| JP | 2008268937 | 11/2008 |
| JP | 2010049263 | 3/2010 |
| JP | 2010114760 A | 5/2010 |
| JP | 2010256397 | 11/2010 |
| KR | 100153873 | 7/1998 |
| KR | 1020080022260 | 3/2008 |
| KR | 1020110022279 | 3/2011 |
| KR | 1020130038076 | 4/2013 |

OTHER PUBLICATIONS

Segan,S. "Hands on with the 41-Megapixel Nokia PureView 808", Feb. 27, 2012, PC Mag, [online], [retrieved on Apr. 16, 2014]. Retrieved from the Internet: , URL:http://www.pcmag.com/article2/0,2817,2400773,00.asp>, pp. 1-9.

Robertson, M et al "Dynamic Range Improvement Through Multiple Exposures". 1999. [online] [retrieved on Apr. 16, 2014]:<URL:http://ieeexplore.ieee.org/xpl/login.jsp?tp=&arnumber=817091&url=http%3A%2F%2Fieeexplore.ieee.org%2Fxpls%2Fabs_all.jsp%3Farnumber%3D817091>, pp. 1-6.

Supplementary European Search Report from Application No. EP15814587, dated Jan. 11, 2018, pp. 1-7.

* cited by examiner

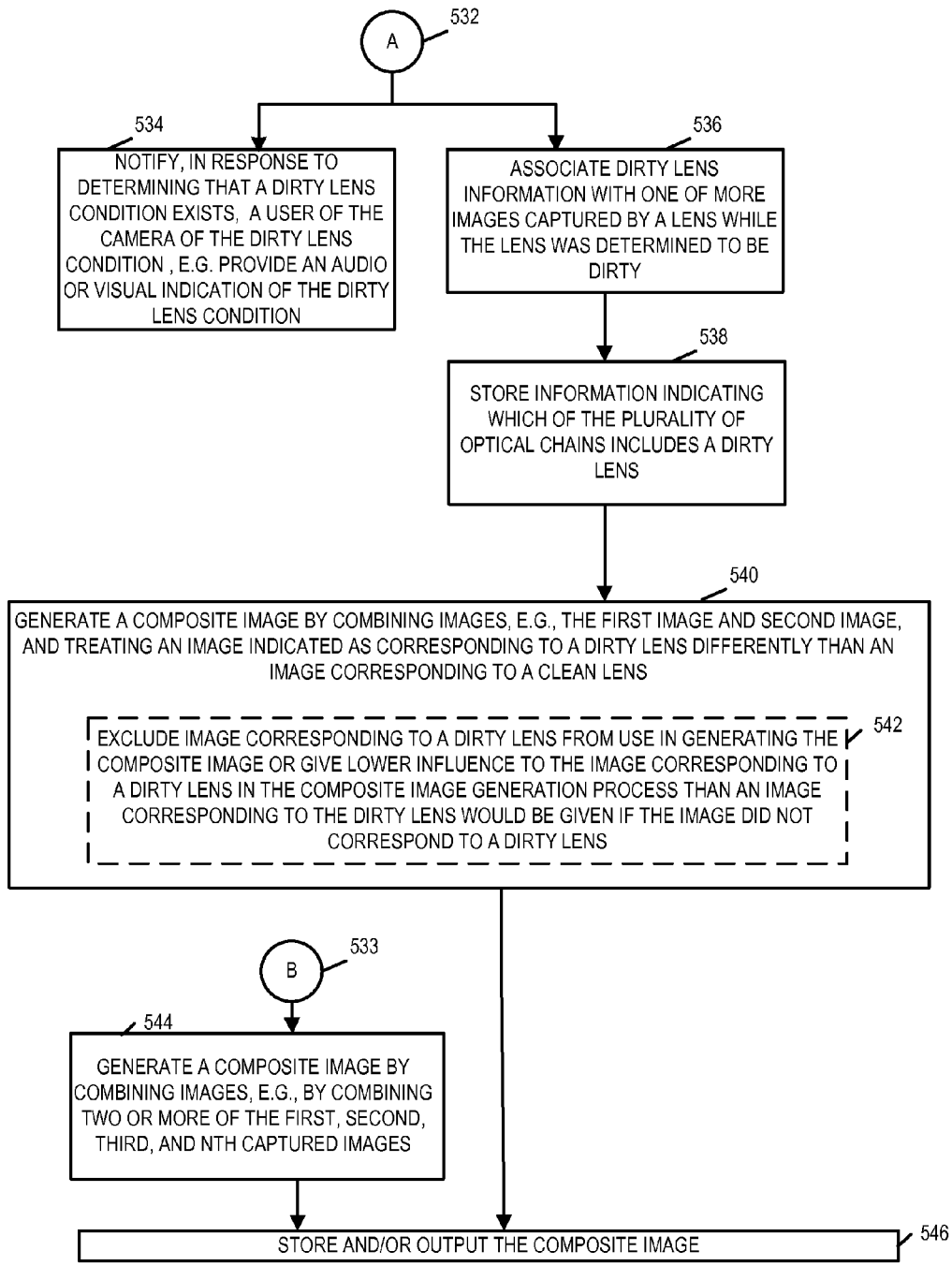

METHODS AND APPARATUS RELATING TO DETECTION AND/OR INDICATING A DIRTY LENS CONDITION

RELATED APPLICATION

The present application claims the benefit of the filing date of U.S. Provisional Application Ser. No. 62/021,097 filed on Jul. 4, 2014 which is hereby expressly incorporated by reference in its entirety.

FIELD

The present application relates to image capture and generation methods and apparatus and, more particularly, to methods and apparatus which detect and/or indicate a dirty lens condition.

BACKGROUND

While professional photographers often go to great lengths to protect and keep their camera lenses clean, even professional photographers may not notice dirt, dust, oil, fingerprints, water droplets or other containments on a lens, sometimes referred to as a dirty lens condition, resulting in degradation to one or more images captured using a dirty camera lens. The problem of dirty camera lenses grows in the case of lower end camera devices where users often store the camera device, e.g., cell phone including a camera, in a pocket or other location where the lens may easily become dirty. Dirty camera lenses of laptop computers, pads, tablets or other devices which may also include cameras can also experience this problem.

While dirt on camera lenses can be a common problem that results in degraded images, the user is often unaware of the degradation in image quality and/or the need to clean a lens until the degradation due to the dirty lens becomes severe and noticeable.

Unfortunately, by the time a dirty camera lens or its effect is noticed by a user of a camera device the opportunity to clean the dirty lens and still capture particular scenes of interest in a timely manner may have passed.

In view of the above discussion it should be appreciated that it would be desirable if methods or apparatus could be developed which detect and alert a user of a camera to a dirty lens condition.

SUMMARY OF INVENTION

Methods and apparatus relating to the detection of a dirty camera lens are described. In accordance with some features, images are captured using one or more camera lenses of a camera device. The images or characteristics of the images are then compared to determine if a dirty camera lens condition exists. In some embodiments the contrast of individual captured images is determined and the contrast of the different images is compared. A difference image contrast, e.g., above a threshold level, is indicative in some embodiments of a dirty camera lens. This is because a dirty camera lens tends to cause blurring and thus a reduction in contrast in a captured image. As a result when the contrast of two images is compared, a significant difference in contrast levels of images corresponding to the same scene which are captured at the same time or close to one another in time can, and in some embodiments does, indicate a dirty lens condition. A pixel level comparison of first and second images can also be used to determine a dirty lens condition with a significant difference, e.g., an average difference over a predetermined or dynamically determined threshold, between the compared image pixels in color or luminance, indicating a dirty lens condition.

In response to determining a dirty lens condition, an indication of the dirty lens condition is generated and presented to a user of the camera. The indication maybe a visual or audible indication of the dirty lens condition.

In at least some embodiments, the methods of the present invention are used in apparatus including multiple optical chains, e.g., each including one or more lenses and being capable of capturing an image. Images or characteristics of images captured by different optical chains are compared and used to determine whether a dirty lens condition exists or not. In the case of a dirty lens condition a user perceivable indication is generated signaling the user of the camera device to make the user aware of the dirty lens condition and the need to perform a lens cleaning operation. In the case of a camera including multiple optical chains, the user may be, and in some embodiments is informed of which lens of the camera device is dirty. Information about the dirty lens condition may, and in some embodiments is, included in a visual display. For example, a dirty lens condition may be indicated by presenting the user with a "Clean Lens X" message specifying to the user which of the plurality of lenses should be cleaned and thus making the user aware that the lens is dirty. Alternatively, a simple message saying "Dirty Lens Condition detected" or some other similar warning may be presented to the user, e.g. via a display on the camera. A camera warning indicator light or particular sound may and in some embodiments is used to indicate a dirty lens condition and optionally which lens in particular is dirty.

Information about a dirty lens maybe and in some embodiments is stored and associated with images captured while the lens is determined to be dirty. The dirty lens condition can and in some embodiments is taken into consideration when generating composite images from images captured from multiple optical chains of the camera device. For example, a dirty lens condition associated with a captured image may result in the image being omitted from use when generating a composite image from multiple captured images, e.g., with the images captured by optical chains not suffering from a dirty lens condition being used without the image corresponding to the dirty lens. Alternatively the image corresponding to the dirty lens and/or pixel values may be given a lower priority or weight in an image combining process so that the dirty lens condition does not degrade the composite image if the image captured using the dirty lens was given the same weight normally applied in the combining process when the dirty lens condition is not detected. Accordingly, in at least some embodiments dirty lens condition information is used in the image combining process when it is available.

When the dirty lens condition is rectified, e.g., by cleaning of the dirty lens, the change in the lens condition is detected and the dirty lens indication is deactivated. The detection of the change in condition may be based on images captured subsequent to the detection of the dirty lens condition.

The methods and apparatus of the present invention can be used to detect dirty lens conditions during periods of time when the camera is performing autofocus or other operations and is not dependent on user selection and capture of specific images to enable the dirty lens detection and notification process to be implemented. However, images captured in response to user control can and are used in dirty lens determination operations in at least some embodiments.

BRIEF DESCRIPTION OF THE FIGURES

FIG. 5 illustrates the combination of FIGS. 5A and 5B.

FIG. 5B is a second part of a flowchart of an exemplary method of operating a camera device in accordance with an exemplary embodiment.

DETAILED DESCRIPTION

Figure 1:
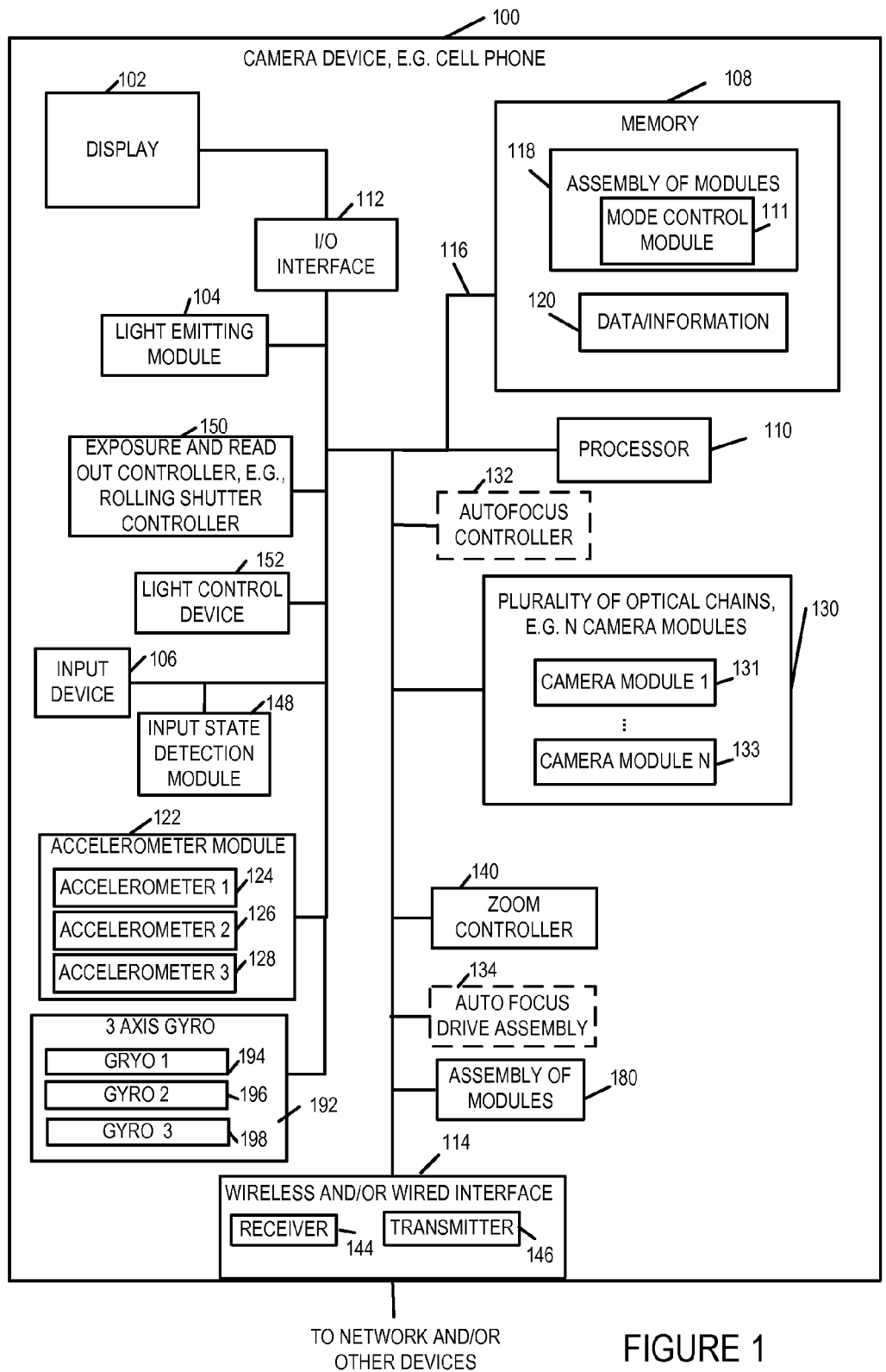
FIG. 1 is a block diagram of an exemplary apparatus, e.g., a camera device, implemented in accordance with one embodiment of the present invention.

FIG. 1 illustrates an exemplary camera device 100 such as a digital camera, notepad with camera functionality, or cell phone with camera functionality, implemented in accordance with one exemplary embodiment of the present invention. The camera device 100, in some embodiments, is a portable device. In other embodiments, the camera device 100 is a fixed device such as a wall mounted camera.

FIG. 1 illustrates the camera device 100 in block diagram form showing the connections between various elements of the apparatus 100. The exemplary camera device 100 includes a display device 102, a light emitter module 104, an input device 106, an input state detection module 148, an exposure and readout controller 150, e.g., a rolling shutter controller 150, a light control device 152, memory 108, a hardware assembly of module 180, a processor 110, a wireless and/or wired interface 114, e.g., a cellular interface, a WIFI interface, and/or a USB interface, an I/O interface 112, an accelerometer module 122, 3 axis gyro 192, and a bus 116 which are mounted in a housing represented by the rectangular box touched by the line leading to reference number 100. The light emitter module 104 includes light emitting elements which maybe LEDs (Light Emitting Diodes) or other types of light emitting elements which can be individually controlled so that all the light emitting elements need not be on at the same time. The input device 106 may be, and in some embodiments is, e.g., keypad, touch screen, or similar device that may be used for inputting information, data and/or instructions. The accelerometer module 122 includes accelerometer 1 124, accelerometer 2, 126 and accelerometer 3 128 which are arrayed on perpendicular axis providing a 3 axis accelerometer module. Thus, the accelerometer module 122 can measure along 3 independent axis. Similarly, the 3-axis gyro 192, which includes 194, 196 and 198 can measure rotation along each of 3 different axis. The output of the accelerometer module 122 and the gyro module 192 can, and in some embodiments is, monitored with changes in accelerometer and gyro output being interpreted and checked over time by processor 110 and/or zoom control module 140 to detect changes in acceleration indicating motion in one or more directions. In some embodiments the input device 106 includes at least one zoom control button that can be used to enable or disable camera zoom functionality. In some such embodiments when the zoom control button is in a depressed state the camera zoom function is enabled while when the button is in a un-depressed state the camera zoom function is disabled. The input state detection module 148 is configured to detect the state of the input device, e.g., the zoom control button, to detect whether the button is in a depressed state or un-depressed state. In some embodiments there is a status register in the camera device 100 that includes a bit indicating the state of the zoom control button detected by the state detection module 148, e.g., whether it is in the depressed state indicating that zoom is enabled or whether it is un-depressed indicating that zoom is disabled.

The display device 102 may be, and in some embodiments is, a touch screen, used to display images, video, information regarding the configuration of the camera device, and/or status of data processing being performed on the camera device. In the case where the display device 102 is a touch screen, the display device 102 serves as an additional input device and/or as an alternative to the separate input device, e.g., buttons, 106. As will be discussed in some embodiments zooming operation can be controlled by pressing a zoom control sensor, e.g., a touch sensor. In some embodiments when the camera user touches the zoom control sensor the zoom functionality is enabled. For example a finger on the touch sensor activates/enables the zoom functionality. The I/O interface 112 couples the display 102 and input device 106 to the bus 116 and interfaces between the display 102, input device 106 and the other elements of the camera which can communicate and interact via the bus 116.

In addition to being coupled to the I/O interface 112, the bus 116 is coupled to the memory 108, hardware assembly of module 180, processor 110, an optional autofocus controller 132, the wireless and/or wired interface 114, a zoom control module 140, and a plurality of optical chains 130, e.g., X optical chains also referred to herein as camera modules. In some embodiments X is an integer greater than 2, e.g., 3, 4, 7 or a larger value depending on the particular embodiment. The plurality of camera modules 130 may be implemented using any of the various camera module sets and/or arrangements described in the present application. Images captured by individual optical chains in the plurality of optical chains 130 can, and in various embodiments are, stored in memory 108, e.g., as part of the data/information 120 and processed by the processor 110, e.g., to generate one or more composite images.

The X camera modules 131 through 133 may, and in various embodiments do, include camera modules having different focal lengths. Multiple camera modules may be provided at a given focal length. For example, multiple camera modules having a 35 mm equivalent focal length to a full frame DSLR camera, multiple camera modules having a 70 mm equivalent focal length to a full frame DSLR camera and multiple camera modules having a 140 mm equivalent focal length to a full frame DSLR camera are included in an individual camera device in some embodiments. The various focal lengths are exemplary and a wide variety of camera modules with different focal lengths may be used. The camera device 100 is to be considered exemplary. To the extent that other references are made to a camera or camera device with regard to some of the other figures, it is to be understood that at least in some embodiments the camera device or camera will include the elements shown in FIG. 1 even if the elements are not shown in a particular figure or embodiment. While in some embodiments all of the elements shown in FIG. 1 are included in the camera device or camera, in other embodiments a subset of the elements shown in FIG. 1 are included and the illustration of the elements in FIG. 1 is not intended to imply that a particular element is essential or necessary in all embodiments.

As will be discussed below images from different camera modules captured at the same time or during a given time period can be combined to generate a composite image, e.g., an image having better resolution, frequency content and/or light range than an individual image captured by a single one of the camera modules 131, 133.

Multiple captured images and/or composite images may, and in some embodiments are, processed to form video, e.g., a series of images corresponding to a period of time. The interface 114 couples the internal components of the camera device 100 to an external network, e.g., the Internet, and/or one or more other devices e.g., memory or stand alone computer. Via interface 114 the camera device 100 can and does output data, e.g., captured images, generated composite images, and/or generated video. The output may be to a network or to another external device for processing, storage and/or to be shared. The captured image data, generated composite images and/or video can be provided as input data to another device for further processing and/or sent for storage, e.g., in external memory, an external device or in a network.

The interface 114 of the camera device 100 may be, and in some instances is, coupled to a computer so that image data may be processed on the external computer. In some embodiments the external computer has a higher computational processing capability than the camera device 100 which allows for more computationally complex image processing of the image data outputted to occur on the external computer. The interface 114 also allows data, information and instructions to be supplied to the camera device 100 from one or more networks and/or other external devices such as a computer or memory for storage and/or processing on the camera device 100. For example, background images may be supplied to the camera device to be combined by the camera processor 110 with one or more images captured by the camera device 100. Instructions and/or data updates can be loaded onto the camera via interface 114 and stored in memory 108.

The lighting module 104 in some embodiments includes a plurality of light emitting elements, e.g., LEDs, which can be illuminated in a controlled manner to serve as the camera flash with the LEDs being controlled in groups or individually, e.g., in a synchronized manner based on operation of the rolling shutter and/or the exposure time. For purposes of discussion module 104 will be referred to as an LED module since in the exemplary embodiment LEDs are used as the light emitting devices but as discussed above the invention is not limited to LED embodiments and other light emitting sources may be used as well. In some embodiments the LED module 104 includes an array of light emitting elements, e.g., LEDs. In some embodiments the light emitting elements in the LED module 104 are arranged such that each individual LED and/or a group of LEDs can be illuminated in a synchronized manner with rolling shutter operation. Light emitting elements are illuminated, in some but not all embodiments, sequentially, so that different portions of an area are illuminated at different times so that the full area need not be consistently lighted during image capture. While all lighting elements are not kept on for the full duration of an image capture operation involving the reading out of the full set of pixel elements of a sensor, the portion of area which is having its image captured, e.g., the scan area, at a given time as a result of the use of a rolling shutter will be illuminated thanks to synchronization of the lighting of light emitting elements with rolling shutter operation. Thus, various light emitting elements are controlled to illuminate at different times in some embodiments based on the exposure time and which portion of a sensor will be used to capture a portion of an image at a given time. In some embodiments the light emitting elements in the LED module 104 include a plurality of sets of light emitting elements, each set of light emitting elements corresponding to a different image area which it illuminates and which is captured by a different portion of the image sensor. Lenses may, and in some embodiments are used to direct the light from different light emitting elements to different scene areas which will be captured by the camera through the use of one or more camera modules.

The rolling shutter controller 150 is an electronic shutter that controls reading out of different portions of one or more image sensors at different times. Each image sensor is read one row of pixel values at a time and the various rows are read in order. As will be discussed below, the reading out of images captured by different sensors is controlled in some embodiments so that the sensors capture a scene area of interest, also sometimes referred to as an image area of interest, in a synchronized manner with multiple sensors capturing the same image area at the same time in some embodiments.

While an electronic rolling shutter is used in most of the embodiments, a mechanical rolling shutter may be used in some embodiments.

The light control device 152 is configured to control light emitting elements (e.g., included in the LED module 104) in a synchronized manner with the operation of the rolling shutter controller 150. In some embodiments the light control device 152 is configured to control different sets of light emitting elements in the array to emit light at different times in a manner that is synchronized with the timing of the rolling shutter 150. In some embodiments the light control device 152 is configured to control a first set of light emitting elements corresponding to a first image area to output light during a first time period, the first time period being determined based on the timing of the rolling shutter and being a period of time during which a first portion of the sensor is exposed for image capture. In some embodiments the light control device 152 is further configured to control a second set of light emitting elements corresponding to a second image area to output light during a second time period, the second time period being determined based on the timing of the rolling shutter and being a period of time during which a second portion of the sensor is exposed for image capture. In some embodiments the first time period includes at least a portion of time which does not overlap the second time period.

In some embodiments the light control device 152 is further configured to control an Nth set of light emitting elements corresponding to an Nth image area to output light during a third time period, said Nth time period being determined based on the timing of the rolling shutter and being a period of time during which an Nth portion of the sensor is exposed for image capture, N being an integer value corresponding to the total number of time periods used by said rolling shutter to complete one full read out of total image area.

In some embodiments the light control device 152 is further configured to control the second set of light emitting elements to be off during said portion of time included in the first period of time which does not overlap said second period of time. In some embodiments the light control device is configured to determine when the first set and said second set of light emitting elements are to be on based on an exposure setting. In some embodiments the light control device is configured to determine when said first set and said second set of light emitting elements are to be on based on an amount of time between read outs of different portions of said sensor. In some embodiments the different sets of light emitting elements in the plurality of light emitting elements are covered with different lenses. In some such embodiments the light control device 152 is further configured to determine which sets of light emitting elements to use based on an effective focal length setting being used by the camera device.

The accelerometer module 122 includes a plurality of accelerometers including accelerometer 1 124, accelerometer 2 126, and accelerometer 3 128. Each of the accelerometers is configured to detect camera acceleration in a given direction. Although three accelerometers 124, 126 and 128 are shown included in the accelerometer module 122 it should be appreciated that in some embodiments more than three accelerometers can be used. Similarly the gyro module 192 includes 3 gyros, 194, 196 and 198, one for each axis which is well suited for use in the 3 dimensional real world environments in which camera devices are normally used. The camera acceleration detected by an accelerometer in a given direction is monitored. Acceleration and/or changes in acceleration, and rotation indicative of camera motion, are monitored and processed to detect one or more directions, of motion e.g., forward camera motion, backward camera motion, etc. The acceleration/rotation indicative of camera motion can be used to control zoom operations and/or be provided in some cases to a camera mount which can then take actions such as rotating a camera mount or rotating a camera support to help stabilize the camera.

The camera device 100 may include, and in some embodiments does include, an autofocus controller 132 and/or autofocus drive assembly 134. The autofocus controller 132 is present in at least some autofocus embodiments but would be omitted in fixed focus embodiments. The autofocus controller 132 controls adjustment of at least one lens position in one or more optical chains used to achieve a desired, e.g., user indicated, focus. In the case where individual drive assemblies are included in each optical chain, the autofocus controller 132 may drive the autofocus drive of various optical chains to focus on the same target.

The zoom control module 140 is configured to perform a zoom operation in response to user input.

The processor 110 controls operation of the camera device 100 to control the elements of the camera device 100 to implement the steps of the methods described herein. The processor may be a dedicated processor that is preconfigured to implement the methods. However, in many embodiments the processor 110 operates under direction of software modules and/or routines stored in the memory 108 which include instructions that, when executed, cause the processor to control the camera device 100 to implement one, more or all of the methods described herein. Memory 108 includes an assembly of modules 118 wherein one or more modules include one or more software routines, e.g., machine executable instructions, for implementing the image capture and/or image data processing methods of the present invention. Individual steps and/or lines of code in the modules of 118 when executed by the processor 110 control the processor 110 to perform steps of the method of the invention. When executed by processor 110, the data processing modules 118 cause at least some data to be processed by the processor 110 in accordance with the method of the present invention. The assembly of modules 118 includes a mode control module which determines, e.g., based on user input which of a plurality of camera device modes of operation are to be implemented. In different modes of operation, different camera modules 131, 133 may and often are controlled differently based on the selected mode of operation. For example, depending on the mode of operation different camera modules may use different exposure times. Alternatively, the scene area to which the camera module is directed and thus what portion of a scene is captured by an individual camera module may be changed depending on how the images captured by different camera modules are to be used, e.g., combined to form a composite image and what portions of a larger scene individual camera modules are to capture during the user selected or automatically selected mode of operation.

The resulting data and information (e.g., captured images of a scene, combined images of a scene, etc.) are stored in data memory 120 for future use, additional processing, and/or output, e.g., to display device 102 for display or to another device for transmission, processing and/or display. The memory 108 includes different types of memory for example, Random Access Memory (RAM) in which the assembly of modules 118 and data/information 120 may be, and in some embodiments are stored for future use. Read only Memory (ROM) in which the assembly of modules 118 may be stored for power failures. Non-volatile memory such as flash memory for storage of data, information and instructions may also be used to implement memory 108. Memory cards may be added to the device to provide additional memory for storing data (e.g., images and video) and/or instructions such as programming. Accordingly, memory 108 may be implemented using any of a wide variety of non-transitory computer or machine readable mediums which serve as storage devices.

Having described the general components of the camera device 100 with reference to FIG. 1, various features relating to the plurality of optical chains 130 will now be discussed with reference to FIGS. 2 and 3 which show the camera device 100 from front and side perspectives, respectively. Dashed line 101 of FIG. 2 indicates a cross section line.

Box 117 represents a key and indicates that OC=optical chain, e.g., camera module, and each L1 represents an outermost lens in an optical chain. Box 119 represents a key and indicates that S=sensor, F=filter, L=lens, L1 represents an outermost lens in an optical chain, and L2 represents an inner lens in an optical chain. While FIG. 3 shows one possible implementation of optical chains, as will be discussed below, other embodiments are possible and the optical chains may include one or more light redirection elements in addition to the elements shown in FIG. 3. The lenses of different optical chains may have different shapes, e.g., with round apertures being used for some lenses and non-round apertures being used for other lenses. However, in some embodiments lenses with round apertures are used for each of the optical chains of a camera device.

Figure 2:
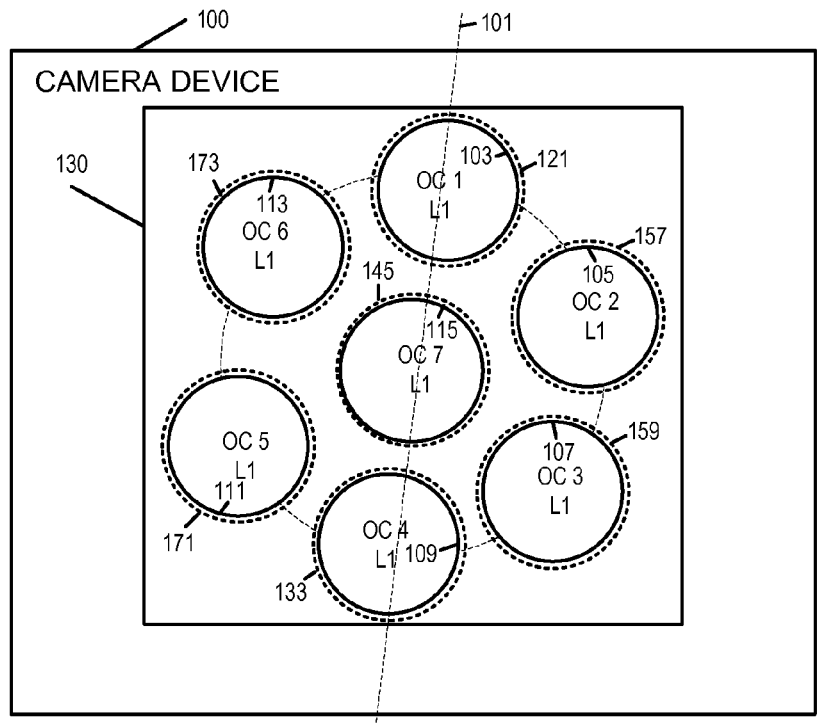
FIG. 2 illustrates a frontal view of an apparatus implemented in accordance with an exemplary embodiment which incorporates multiple optical chains, e.g., camera modules, in accordance with the present invention with lenses which are viewable from the front of the camera.

FIG. 2 shows the front of the exemplary camera device 100. Rays of light 131, which is light toward the front of the camera assembly, shown in FIG. 1 may enter the lenses located in the front of the camera housing. From the front of camera device 100, the camera device 100 appears as a relatively flat device with the outer rectangle representing the camera housing and the square towards the center of the camera representing the portion of the front camera body in which the plurality of optical chains 130 is mounted. Note that while outer lenses shown in FIG. 2 are shown as having circular apertures which are the same size, as will be discussed below different size lenses may be used for different optical chains, e.g., depending on the focal length with optical chains having larger focal lengths normally including outer lenses with larger apertures than optical chains with small focal lengths.

Figure 3:
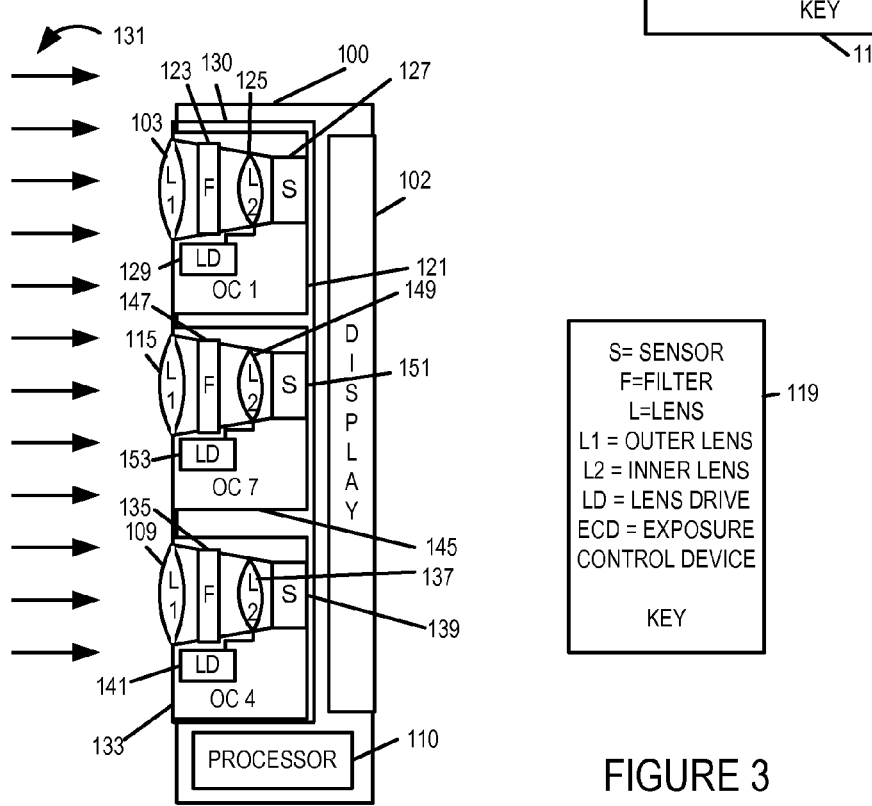
FIG. 3, which is a side view of the exemplary apparatus of FIG. 2, illustrates further details of the exemplary apparatus.

FIG. 3, which shows a side perspective of camera device 100, illustrates three of the seven optical chains (OC 1 121, OC 7 145, OC 4 133) of the set of optical chains 130, display 102 and processor 110. OC 1 121 includes an outer lens L1 103, a filter 123, an inner lens L2 125, and a sensor 127. In some embodiments the OC 1 121 further includes lens drive (LD) 129 for controlling the position of lens L2 125 for zooming and/or auto focus operation purposes. The exposure and read out controller 150 is not shown in the figure but is used for controlling the read out of rows of pixel values form the sensors' 127, 151 and 139 in a synchronized manner, e.g., taking into consideration the scene area being captured by the individual sensors. The LD 129 includes a motor or other drive mechanism which can move the lens, barrel or cylinder housing one or more lenses, or sensor, to which it is connected thereby allowing for an alteration to the light path by moving one or more elements relative to the other elements of the optical chain to which the LD is coupled. While the LD 129 is shown coupled, e.g., connected, to the lens L2 125 and thus can move the position of the lens L2, e.g., as part of a zooming or autofocus operation, in other embodiments the LD 129 is coupled to a cylindrical or barrel shape component which is part of the optical chain or to the sensor 127. Thus, the lens drive can alter the relative position of a lens to the sensor 127, e.g., to change the distance between the sensor 127 and the lens 125 as part of a zooming and/or focus operation. OC 7 145 includes an outer lens L1 115, a filter 147, an inner lens L2 149, and a sensor 151. OC 7 145 further includes LD 153 for controlling the position of lens L2 149. The LD 153 includes a motor or other drive mechanism which can move the lens, barrel, cylinder, sensor or other optical chain element to which it is connected.

OC 4 133 includes an outer lens L1 109, a filter 135, an inner lens L2 137, and a sensor 139. OC 4 133 includes LD 141 for controlling the position of lens L2 137. The LD 141 includes a motor or other drive mechanism and operates in the same or similar manner as the drives of the other optical chains. While only three of the OCs are shown in FIG. 3 it should be appreciated that the other OCs of the camera device 100 may, and in some embodiments do, have the same or similar structure and/or may include other elements such as light redirection devices. Thus, differences between the multiple optical chains of the camera device 100 are possible and, in some embodiments, are present to allow for a variety of focal lengths to be supported in a single camera device through the use of multiple optical chains which can be operated in parallel.

FIG. 3 and the optical chains (OCs), also sometimes referred to as camera modules, illustrated therein are illustrative of the general structure of OCs used in various embodiments. However, numerous modifications and particular configurations are possible. While reference to elements of FIG. 3 may be made, it is to be understood that the OCs (camera modules) in a particular embodiment will be configured as described with regard to the particular embodiment and that various different camera modules are often used in single camera device. Such modules can be used alone or in combination with other modules such as the ones shown in FIGS. 3 and 4 or other figures of the present application.

While a filter may be of a particular color or used in some optical chains, filters need not be used in all optical chains and may not be used in some embodiments. In embodiments where the filter is expressly omitted and/or described as being omitted or an element which allows all light to pass, while reference may be made to the OCs of FIG. 3 it should be appreciated that the filter will be omitted in an embodiment where it is indicated to be omitted or of such a nature that it allows a broad spectrum of light to pass if the embodiment is indicated to have a broadband filter. While in the OCs of FIG. 3 light redirection devices (R), e.g., mirrors or prisms are not shown, in at least some embodiments one or more mirrors are included in OCs for light to be redirected, e.g., to increase the length of the optical path or make for a more convenient internal component configuration. It should be appreciated that each of the OCs 121, 145, 133, shown in FIG. 3 will have their own optical axis. In the example, each optical axis passes through the center of the lens 103, 115, or 109 at the front of the optical chain and passes through the OC to the corresponding sensor 127, 151, 139.

While the processor 110 is not shown being coupled to the LD, and sensors 127, 151, 139 it is to be appreciated that such connections exist and are omitted from FIG. 3 to facilitate the illustration of the configuration of the exemplary OCs.

As should be appreciated the number and arrangement of lens, filters and/or mirrors can vary depending on the particular embodiment and the arrangement shown in FIG. 3 is intended to be exemplary and to facilitate an understanding of various features rather than to be limiting in nature.

The front of the plurality of optical chains 130 is visible in FIG. 2 with the outermost lens of each optical chain appearing as a circle represented using a solid line (OC 1 L1 103, OC 2 L1 105, OC 3 L1 107, OC 4 L1 109, OC 5 L1 111, OC 6 L1 113, OC 7 L1 115). In the FIG. 2 example, the plurality of optical chains 130 include seven optical chains, OC 1 121, OC 2 157, OC 3 159, OC 4 133, OC 5 171, OC 6 173, OC 7 145, which include lenses (OC 1 L1 103, OC 2 L1 105, OC 3 L1 107, OC 4 L1 109, OC 5 L1 111, OC 6 L1 113, OC 7 L1 115), respectively, represented by the solid circles shown in FIG. 2. The lenses of the optical chains are arranged to form a pattern which is generally circular in the FIG. 2 example when viewed as a unit from the front. While a circular arrangement is used in some embodiments, non-circular arrangements are used and preferred in other embodiments. In some embodiments while the overall pattern is generally or roughly circular, different distances to the center of the general circle and/or different distances from one lens to another is intentionally used to facilitate generation of a depth map and block processing of images which may include periodic structures such as repeating patterns without the need to identify edges of the repeating pattern. Such repeating patterns may be found in a grill or a screen.

The overall total light capture area corresponding to the multiple lenses of the plurality of optical chains OC 1 to OC 7, also sometimes referred to as optical camera modules, can, in combination, approximate that of a lens having a much larger opening but without requiring a single lens having the thickness which would normally be necessitated by the curvature of a single lens occupying the area which the lenses shown in FIG. 2 occupy.

While gaps are shown between the lens openings of the optical chains OC 1 to OC 7, it should be appreciated that the lenses may be made, and in some embodiments are, made so that they closely fit together minimizing gaps between the lenses represented by the circles formed by solid lines. While seven optical chains are shown in FIG. 2, it should be appreciated that other numbers of optical chains are possible. For example, seventeen camera modules are used in a single camera device in some embodiments. Camera devices including even larger numbers of optical chains are also possible.

The use of multiple optical chains has several advantages over the use of a single optical chain. Using multiple optical chains allows for noise averaging. For example, given the small sensor size there is a random probability that one optical chain may detect a different number, e.g., one or more, photons than another optical chain. This may represent noise as opposed to actual human perceivable variations in the image being sensed. By averaging the sensed pixel values corresponding to a portion of an image, sensed by different optical chains, the random noise may be averaged resulting in a more accurate and pleasing representation of an image or scene than if the output of a single optical chain was used.

Given the small size of the optical sensors (e.g., individual pixel elements) the dynamic range, in terms of light sensitivity, is normally limited with the sensors becoming easily saturated under bright conditions. By using multiple optical chains corresponding to different exposure times the dark areas of a scene can be sensed by the sensor corresponding to the longer exposure time while the light areas of a scene can be sensed by the optical chain with the shorter exposure time without getting saturated. Pixel sensors of the optical chains that become saturated as indicated by a pixel value indicative of sensor saturation can be ignored, and the pixel value from the other, e.g., less exposed, optical chain can be used without contribution from the saturated pixel sensor of the other optical chain. Weighting and combining of non-saturated pixel values as a function of exposure time is used in some embodiments. By combining the output of sensors with different exposure times a greater dynamic range can be covered than would be possible using a single sensor and exposure time.

FIG. 3 is a cross section perspective of the camera device 100 shown in FIGS. 1 and 2. Dashed line 101 in FIG. 2 shows the location within the camera device to which the cross section of FIG. 3 corresponds. From the side cross section, the components of the first, seventh and fourth optical chains are visible.

As illustrated in FIG. 3 despite including multiple optical chains the camera device 100 can be implemented as a relatively thin device, e.g., a device less than 2, 3 or 4 centimeters in thickness in at least some embodiments. Thicker devices are also possible, for example devices with telephoto lenses, and are within the scope of the invention, but the thinner versions are particularly well suited for cell phones and/or tablet implementations. As will be discussed below, various techniques such as the use of light redirection elements and/or non-circular lenses can be used in conjunction with small sensors, such as those commonly used in handheld cameras, to support relatively large focal lengths, e.g., camera modules of 150 mm equivalent focal length to a full frame DSLR camera, 300 mm equivalent focal length to a full frame DSLR camera or above in a relatively thin camera device format.

As illustrated in the FIG. 3 diagram, the display device 102 may be placed behind the plurality of optical chains 130 with the processor 110, memory and other components being positioned, at least in some embodiments, above or below the display and/or optical chains 130. As will be discussed below, and as shown in FIG. 3, each of the optical chains OC 1 121, OC 7 145, OC 4 133 may, and in some embodiments do, include an outer lens L1, an optional filter F, and a second optional lens L2 which proceed a sensor S which captures and measures the intensity of light which passes through the lens L1, filter F and second lens L2 to reach the sensor S. The filter may be a color filter or one of a variety of other types of light filters or may be omitted depending on the particular optical chain embodiment or configuration.

Note that while supporting a relatively large light capture area and offering a large amount of flexibility in terms of color filtering and exposure time, the camera device 100 shown in FIG. 3 is relatively thin with a thickness that is much less, e.g., ⅕th, 1/10th, 1/20th or even less than the overall side to side length or even top to bottom length of the camera device visible in FIG. 2.

Figure 4:
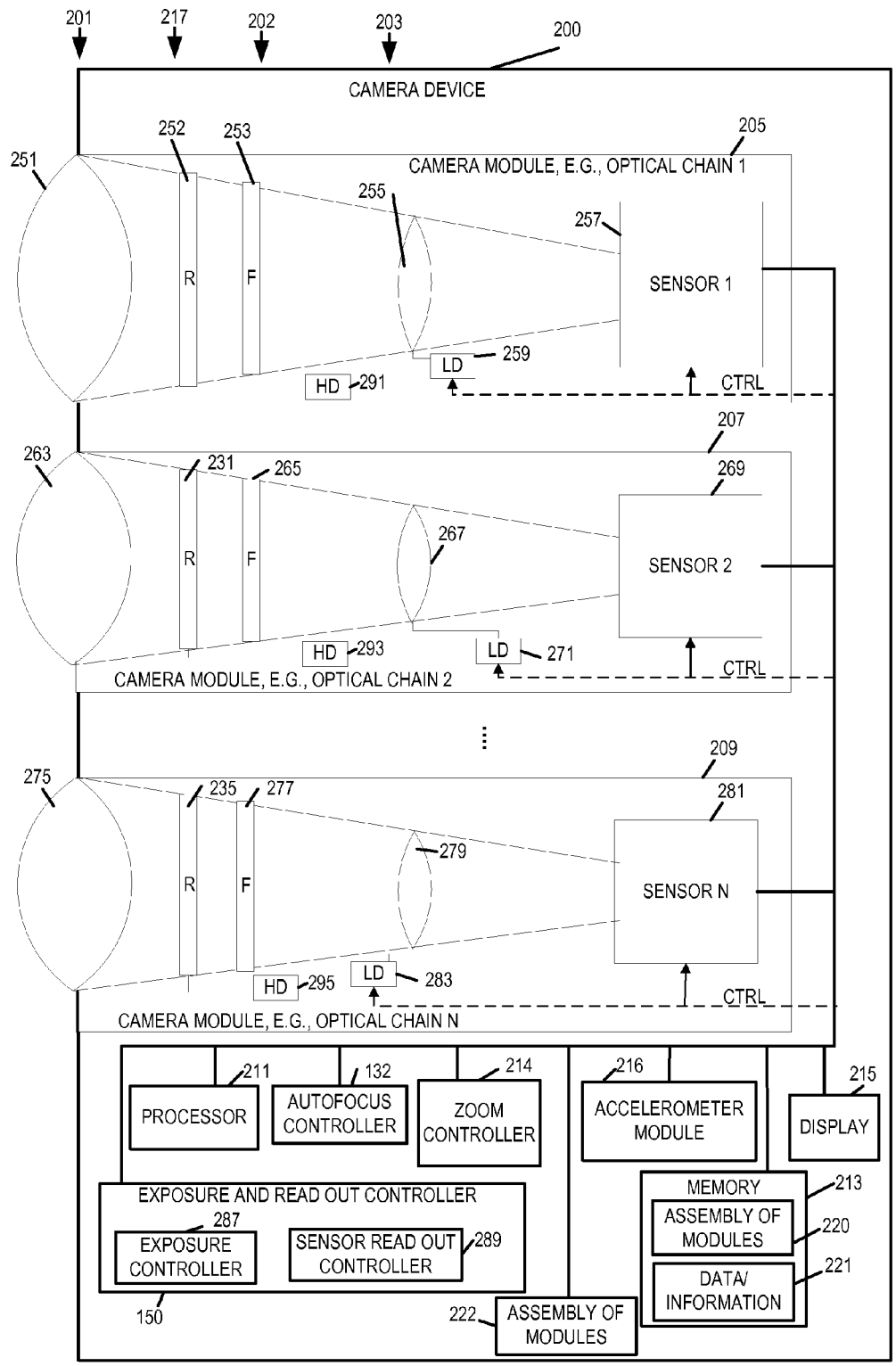
FIG. 4 illustrates a camera device implemented in accordance with another embodiment.

FIG. 4 illustrates a camera device 200 implemented in accordance with the invention. The FIG. 4 camera device 200 includes many or all of the same elements shown in the device 100 of FIGS. 1-3. Exemplary camera device 200 includes a plurality of optical chains (OC 1 205, OC 2 207, . . . , OC N 209, a processor 211, memory 213, an assembly of modules 222 and a display 215, coupled together. OC 1 205 includes outer lens L1 251, a light redirection element R 252, a hinge (or mirror) drive HD 291, filter 253, inner lens L2 255, sensor 1 257, and LD 259. The HD 291 can be used to move a position of a hinge to which the light redirection device (R) 252, e.g., mirror, is mounted and thus move the mirror to change the scene area to which the module 205 is directed without moving the lens 251. Moving (e.g., rotating about a hinge) the mirror 252 to change the scene area to which the module 205 is directed is especially useful in an embodiment where the outer lens 251 is a plane piece of glass or a plastic piece with no optical power as is the case in some embodiments. The outer lens of each camera module maybe, and in some embodiments is, a portion of a plate of flat or relatively flat glass which covers the light entry point of each optical chain. Thus while a single plate of glass, plastic or other material which can transmit light may cover the opening to multiple optical chains the portion of the glass or other covering that covers the opening of an individual optical chain serves as the outer lens for that optical chain. In some cases the outer lens is used to primarily protect the components of the optical chain from dust and dirt and his little effect on the light passing through the outer lens.

The optical chains shown in FIG. 4 can be arranged in various positions within the camera 200.

In some but not all embodiments, processor 211 of camera device 200 of FIG. 4 is the same as or similar to processor 110 of device 100 of FIG. 1 and works in the same or similar manner described above, e.g., in connection with executing instructions stored in memory to perform various operations, memory 213 of device 200 of FIG. 4 is the same as or similar to the memory 108 of device 100 of FIG. 1, the assembly of modules 220 of device 200 of FIG. 4 is the same as or similar to the assembly of modules 118 of FIG. 1, the data/information 221 of device 200 of FIG. 1 is the same as or similar to the data/information 120 of FIG. 1, the assembly of modules 222 of device 200 of FIG. 4 is the same as or similar to the hardware assembly of modules 180 of FIG. 1, the zoom control module 214 of device 200 is the same as or similar to the zoom control module 140 of device 100, the accelerometer module 216 of device 200 is the same as or similar to the accelerometer module 122 of device 100 and display 215 of device 200 of FIG. 4 is the same as or similar to the display 102 of device 100 of FIG. 1.

OC 2 207 includes outer lens L1 263, light redirection device 231, hinge drive 293, filter 265, inner lens L2 267, sensor 2 269, and LD 271. OC N 209 includes outer lens L1 275, light redirection device 235, hinge drive 295, filter 277, inner lens L2 279, sensor N 281, and LD 283. The exposure and read out controller 150 controls sensors to read out, e.g., rows of pixel values, in a synchronized manner while also controlling the exposure time. In some embodiments the exposure and read out controller 150 is a rolling shutter controller including an exposure controller 287 and a sensor read out controller 289. An autofocus controller 132 is included to control the lens drives 259, 271 and 283 in some embodiments.

In the FIG. 4 embodiment the optical chains (optical chain 1 205, optical chain 2 207, . . . , optical chain N 209) are shown as independent assemblies with the lens drive of each module being a separate LD element (LD 259, LD 271, LD 283), respectively. Each of the LDs shown adjusts the position of the corresponding lens to which it is connected as part of a zooming and/or focus operation. In some embodiments the LD controls the position of a lens and/or sensor in which case the LD is connected to both a lens support mechanism or lens and the sensor.

In FIG. 4, the structural relationship between the mirror and various lenses and filters which precede the sensor in each optical chain can be seen more clearly than in some of the other figures. While four elements, e.g. two lenses (see columns 201 and 203 corresponding to L1 and L2, respectively), a light redirection device R (see col. 217), and the filter (corresponding to column 202) are shown in FIG. 4 before each sensor, it should be appreciated that a much larger combinations (e.g., numbers) of lenses, light redirection elements and/or filters may precede the sensor of one or more optical chains with anywhere from 2-10 elements being common and an even larger number of elements being used in some embodiments, e.g., high end embodiments and/or embodiments supporting a large number of filter and/or lens options. Furthermore it should be appreciated that all illustrated elements need not be included in all optical chains. For example, in some embodiments optical chains having relatively short focal lengths may be implemented without the use of a light redirection element being used, e.g., to redirect the light by 90 degrees, since the optical chain with a short focal length can be implemented in a straight but still relatively compact manner given the short focal length.

In some but not all embodiments, optical chains are mounted in the camera device with some, e.g., the shorter focal length optical chains extending in a straight manner from the front of the camera device towards the back. However, in the same camera, longer focal length camera modules may and sometimes do include light redirection devices which allow at least a portion of the optical path of a camera module to extend sideways allowing the length of the optical axis to be longer than the camera is deep. The use of light redirection elements, e.g., mirrors, is particularly advantageous for long focal length camera modules given that the overall length of such modules tends to be longer than that of camera modules having shorter focal lengths. A camera may have a wide variety of different camera modules some with light redirection elements, e.g., mirrors, and others without mirrors. Filters and/or lenses corresponding to different optical chains may, and in some embodiments are, arranged in planes, e.g. the apertures of the outermost lenses may be configured in a plane that extends parallel to the face of the camera, e.g., a plane in which the front of the camera both extends vertically and horizontally when the camera is in a vertical direction with the top of the camera both being up.

Figure 5A:
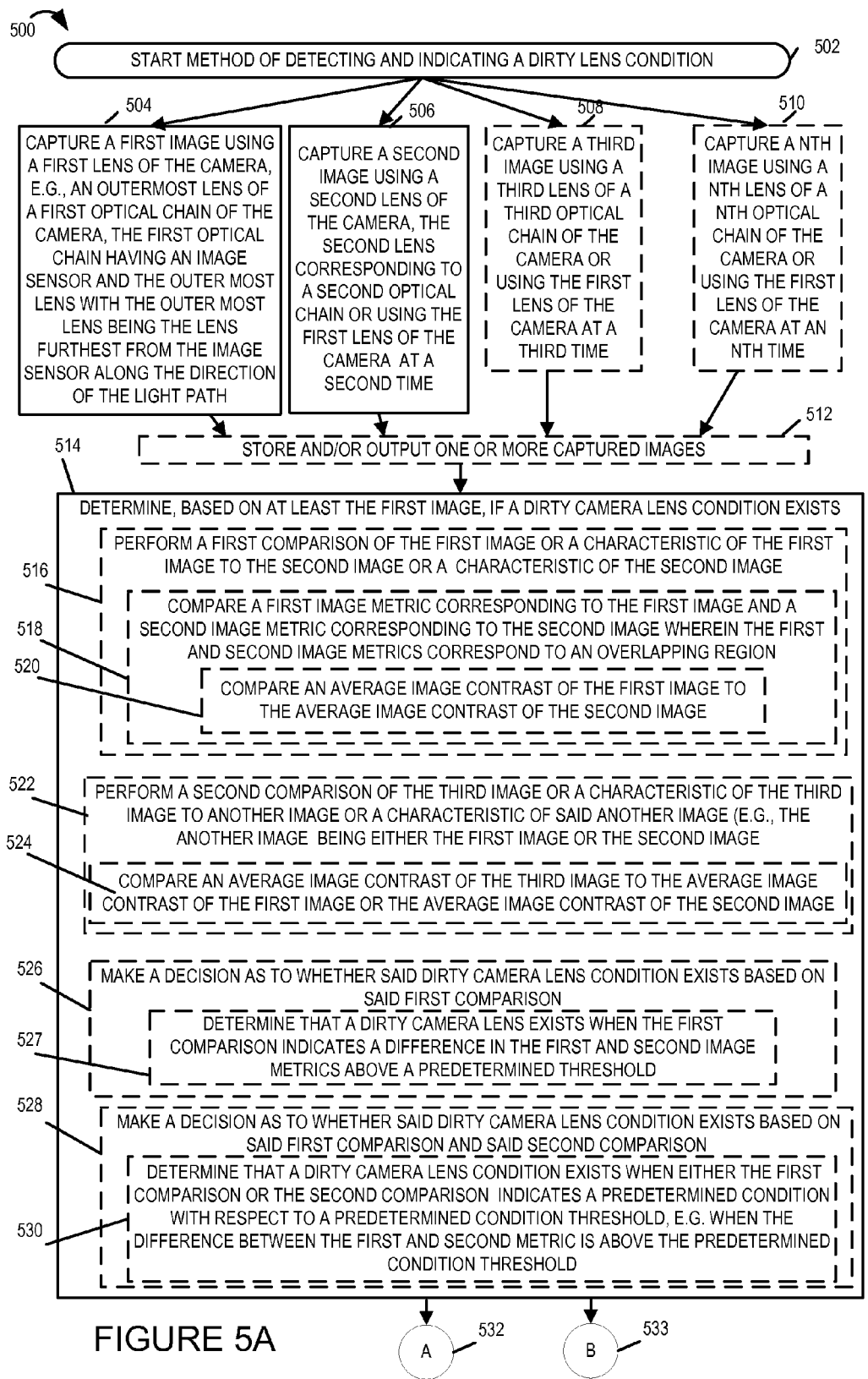
FIG. 5A is a first part of a flowchart of an exemplary method of operating a camera device in accordance with an exemplary embodiment.

FIG. 5 which comprises FIG. 5A and FIG. 5B shows a flowchart 500 illustrating the steps of an exemplary method of operating an apparatus for capturing images, e.g., a camera device, for detecting and indicating a dirty lens condition. The method includes controlling an imaging device, e.g., such as that shown in FIG. 1 or FIG. 4 to capture images, detect a dirty lens condition, and provide an indication of a dirty lens condition in accordance with an exemplary embodiment. The camera device implementing the method of flowchart 500 can and sometimes does include the same or similar elements as the camera devices of FIGS. 1 and/or 4.

Figure 6:
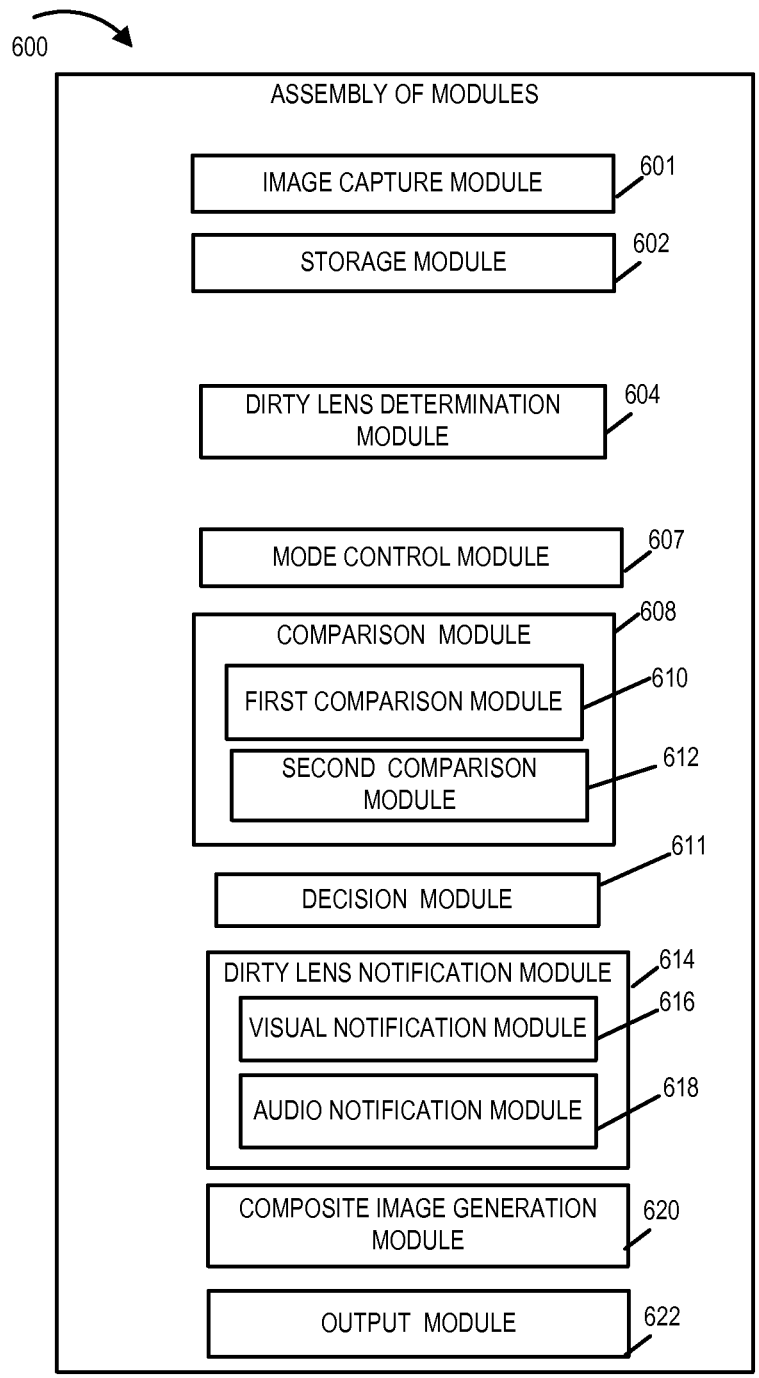
FIG. 6 illustrates an exemplary assembly of modules in accordance with an exemplary embodiment.

FIG. 6 illustrates an assembly of modules 600 which includes an image capture module 601, a storage module 602, a dirty lens determination module 604, a mode control module 607, a comparison module 608, a decision module 611, a dirty lens notification module 614, a composite image generation module 620, and output module 622. In some embodiments, assembly of modules 600 also includes a dirty lens cleaning module. In some embodiments, the comparison module includes two sub-modules a first comparison module 610 and a second comparison module 612. In some embodiments, the dirty lens notification module 614 includes two sub-modules a visual notification module 616 and an audio notification module 618. In some embodiments, the modules and sub-modules contained in assembly of modules 600 are implemented as a set of hardware modules, e.g., circuits and/or combination of circuits and software and is included in the hardware assembly of modules 180 in device 100 or hardware assembly of modules 222 in device 200. In some embodiments, the assembly of modules are software routines and instructions which the processor executes to perform the functions described below. In such cases the assembly of modules 600 is stored in memory e.g., assembly of modules 118 of memory 120 of device 100 or in assembly of modules 220 of memory 213 of device 200. In some embodiments, one or more of the modules and/or sub-modules of the assembly modules 600 is implemented as a combination and/or software with the software being executed by a processor, e.g., processor 211 of device 200 or processor 110 of device 100. While in the explanation of the method 500 the modules are described as performing functions it should be under that when the module is implemented as a software module a processor, e.g., processor 211 is executing instructions to perform the operation being described.

Figure 7:
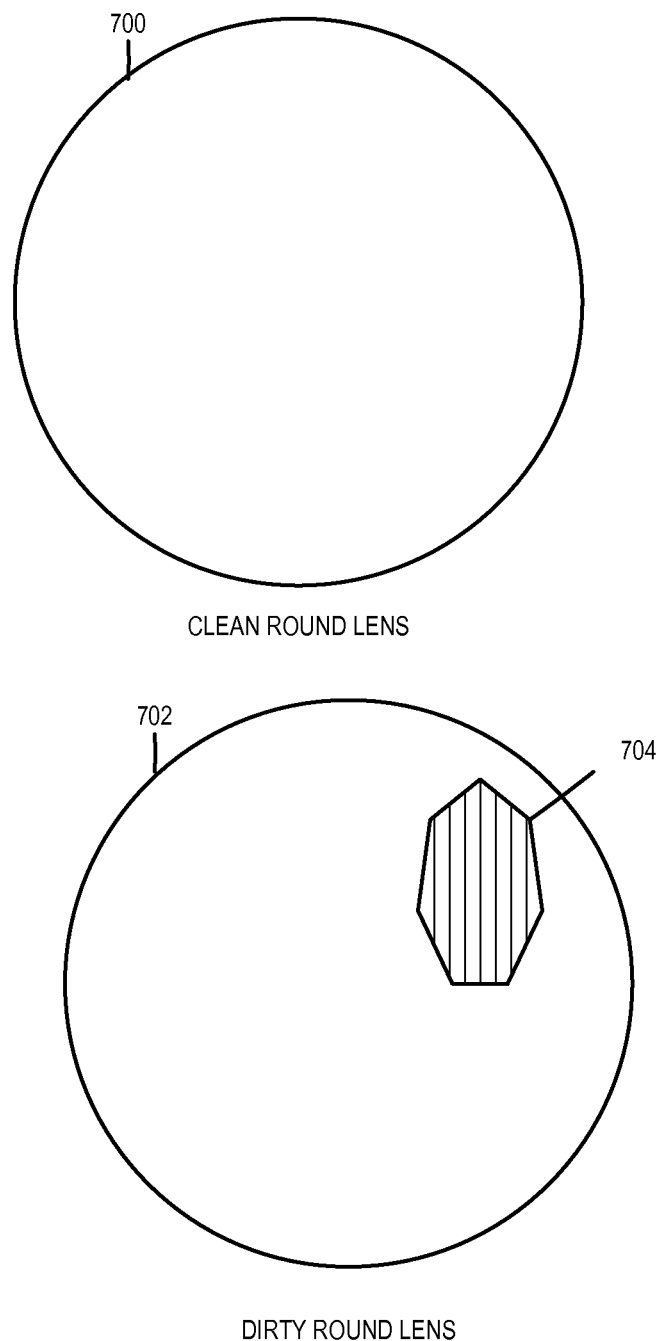
FIG. 7 illustrates a clean round lens and a dirty round lens in accordance with an exemplary embodiment.

FIG. 7 shows a clean round lens 700, e.g., which may be a first outermost lens of a first optical chain. FIG. 7 also shows a dirty round lens 702 with contamination shown as element 704, the contamination may be for example dirt, oil, or a fingerprint. The dirty round lens 702 may be for illustrative purposes a second outermost lens of a second optical chain.

Figure 8:
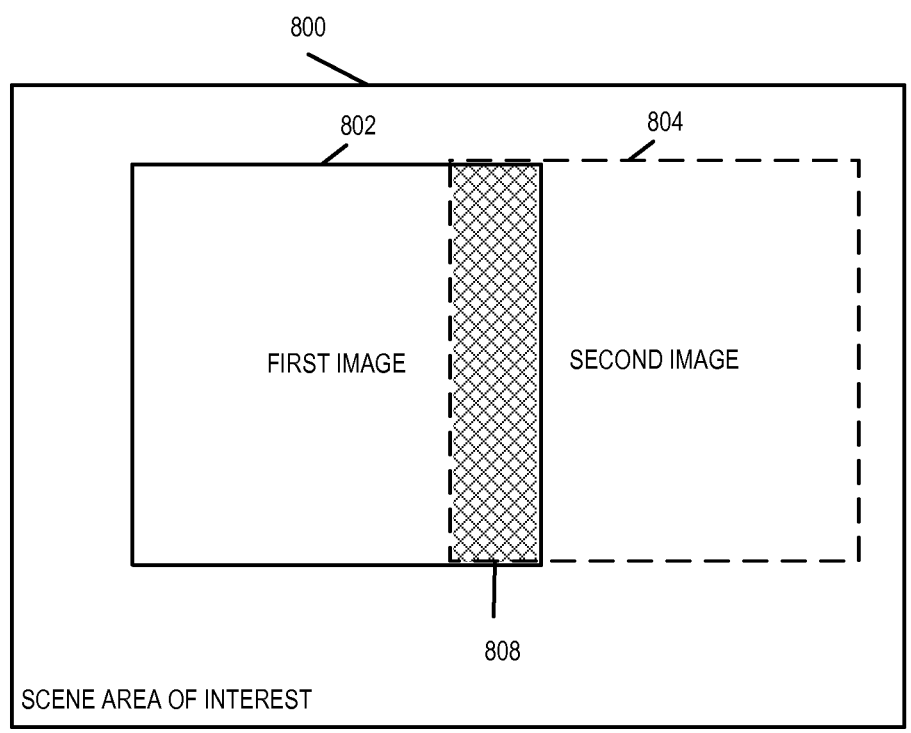
FIG. 8 illustrates a first image and a second image with an overlapping region in accordance with one embodiment of the present invention.

FIG. 8 illustrates a first scene area of interest 800, a first captured image 802 illustrated as a rectangle formed with solid lines, a second captured image 804 illustrated as a rectangle formed with dashed lines, and a cross hatched filled rectangular area 808 illustrating the overlapping region of the first and second captured images. One of skill in art will appreciate that the first image 802 is a first portion of the scene area of interest 800 and the second image 804 is a second portion of the scene area of interest 800 with the cross hatched filled rectangle 808 being an overlapping region of the first and second images. For explanatory purposes the first image was captured using the first optical chain including clean round outermost lens 700 and the second image was captured using the second optical chain including the dirty round outermost lens 702.

Figure 9:
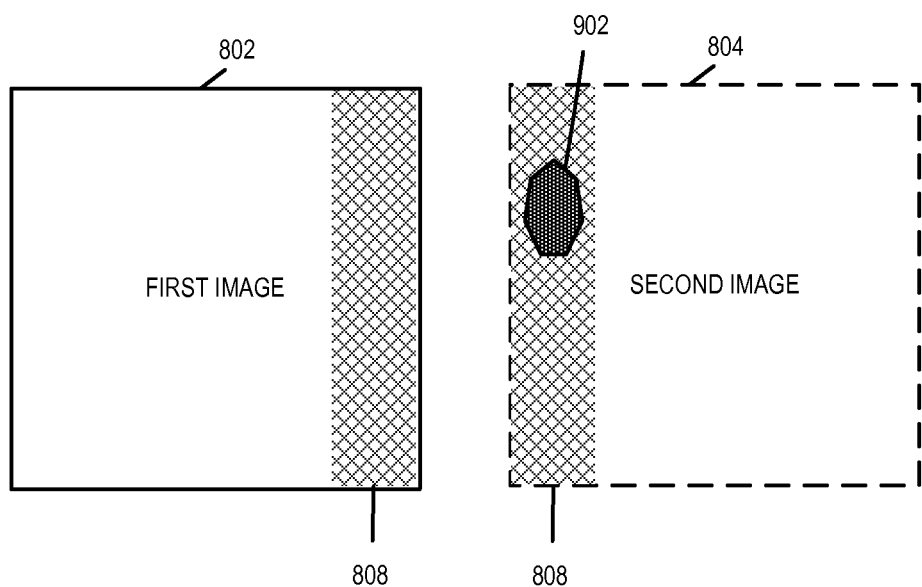
FIG. 9 illustrates a first image and a second image with an overlapping region wherein said second image has been captured using a contaminated or dirty lens in accordance with one embodiment of the present invention.

FIG. 9 illustrates the first captured image 802 and second captured image 804 of FIG. 8 as separate images. FIG. 9 further illustrates the overlapping region 808 as a cross hatched section on the first and second captured images. FIG. 9 further illustrates that contamination, e.g., dirt on the lens 702 of the second optical chain has results in a darker portion of second image 902 in the overlapping region. In accordance with one embodiment of the present invention by comparing the overlapping portions of the first and second images the contamination, e.g., dirt on the lens 702 may be identified and the user of the device, e.g., device 200 may be notified via an audio or visual indication that the lens 702 is dirty.

The exemplary method of flowchart 500 for detecting and indicating a dirty lens condition will now be described in detail. The method of flowchart 500 can be, and in some embodiments is, performed using a camera device such as the camera 100 of FIG. 1. In one such embodiment the plurality of optical chains 130 of the camera device 100 include optical chains, e.g., camera modules. For explanatory purposes, the method 500 will now be described using the camera devices of FIGS. 1 and 4.

The exemplary method starts in step 502, e.g., with the initiation, e.g., by a user of the capture of an image, e.g., of a scene area of interest, which causes the camera device, e.g., camera device 100 or 200, to initiate image capture of the scene area of interest by one or more optical chains. For the purposes of explanation, the camera device being utilized in this exemplary method includes a plurality of optical chains, and each of the optical chains can be independently operated and controlled.

Operation proceeds from step 502 to steps 504, 506, 508, and 510, which involve image capture operations which are performed by image capture module 601. The image capture operations may and in some embodiments are performed in a synchronized manner. In some embodiments, the image capture module operates the two or more of the optical chains of the camera device 200 to capture images at the same time. In other embodiments the same camera module may be used to capture images sequentially with different images corresponding to sequential capture image time periods. For example a first camera module may be used to sequentially capture first, second, third through Nth images rather than using N camera modules to capture N images at the same time. In accordance with the invention, images captured in parallel by different camera modules can be used to detect whether a camera module has a dirty lens, e.g., a transparent outer cover, or alternatively images captured in parallel can by different camera modules can be compared to determine if one or more of the camera modules suffers from a dirty lens. Thus, in some embodiments the first and second optical chains of camera device 200 are operated at the same time to capture the first and second images, respectively. While in other embodiments one or more modules are operated to sequentially capture images with one or more images of a camera module being compared to a previously captured image to detect a dirty lens condition. In some embodiments a combination of comparing images captured in parallel by different camera modules along with a comparison of images captured by an individual module over time are both performed to increase the reliability of a dirty lens determination. In at least some synchronized embodiments the images captured by some by not necessarily all of the different optical chains correspond to the same or an overlapping time period. In other embodiments image capture is not synchronized but multiple one of the captured images are captured during the same or an overlapping time period. In still other embodiments as least some images are captured sequentially, e.g., in rapid succession. Sequential image capture may, and in some embodiments are used for capturing images corresponding to different portions of a scene area.

In step 504 a first image, e.g., a first portion of the scene area of interest, is captured using a first lens of the camera, e.g., an outermost lens of a first optical chain of the camera. In some embodiments, the first optical chain, e.g., optical chain 205 of device 200 includes an image sensor 257 and the outermost lens 251 with the outermost lens 251 being the lens furthest from the image sensor along the direction of the path of the light. In some but not all embodiments, the first portion of the scene area of interest is the entire scene area of interest. Operation proceeds from step 504 to step 512. Step 512 is performed in some but not necessarily all embodiments. In some embodiments where step 512 is skipped operation proceeds directly to step 514.

In step 506 a second image, e.g., a second portion of the scene area of interest, is captured using a second lens of the camera. The second lens corresponding to a second optical chain of the camera device. For example, the second outermost lens 263 of optical chain 2 207 of device 200. The second lens being different from the first lens. In some, but not all, embodiments the second portion of the scene area of interest is the entire scene area of interest. In some, but not all embodiments, the second portion of the scene area of interest is not the entire scene area of interest but includes at least an overlapping region with the first portion of the scene area of interest. In some embodiments, the first and second images are of the entire scene area of interest. In some embodiments the first and second images are of different scenes but have an overlapping area of image capture. In some embodiments, the first and second images are overlapping images of a scene area. Operation proceeds from step 506 to step 512. Step 512 is performed in some but not necessarily all embodiments. In some embodiments where step 512 is skipped operation proceeds directly to step 514.

In step 508 a third image, e.g., a third portion of the scene area of interest, is captured using a third lens of the camera device. The camera device including a third optical chain, e.g., optical chain 209 having a third lens, e.g., a third outermost lens 275, and a sensor 281. The third outermost lens 275 is separate from said first and second lens. In some embodiments the first optical chain captures the first image using a first sensor, the second optical chain captures the second image using a second sensor and the third optical chain captures the third image using a third sensor. In some, but not all embodiments, the third portion of the scene area of interest is not the entire scene area of interest but includes at least an overlapping region with the first portion of the scene area of interest. In some embodiments, the first, second, and third images are of the entire scene area of interest. In some embodiments the first, second, and third images are of different scenes but have an overlapping area of image capture. Operation proceeds from step 508 to step 512. Step 512 is performed in some but not necessarily all embodiments. In some embodiments where step 512 is skipped operation proceeds directly to step 514.

In step 510 a Nth image, e.g., a Nth portion of the scene area of interest, is captured using an Nth lens of the camera device. The camera device including a Nth optical chain having a Nth lens, e.g., Nth outermost lens, and a sensor. The Nth outermost lens is separate from said first, second, and third lens. In some embodiments the first optical chain captures the first image using a first sensor, the second optical chain captures the second image using a second sensor, the third optical chain captures the third image using a third sensor, and the Nth optical chain captures the Nth image using a Nth sensor. In some, but not all embodiments, the Nth portion of the scene area of interest is not the entire scene area of interest but includes at least an overlapping region with the first portion of the scene area of interest. In some embodiments, the first, second, third, and Nth images are of the entire scene area of interest. In some embodiments the first, second, third and Nth images are not of the entire scene are of interest but have one or more overlapping areas of image capture. Operation proceeds from step 508 to step 512. Step 512 is performed in some but not necessarily all embodiments. In some embodiments where step 512 is skipped operation proceeds directly to step 514.

In step 512, storage module 602 of assembly of modules 600 stores one or more of the captured images, e.g., first, second, third or Nth images in memory, e.g., date/information section 221 of memory 213, and/or outputted by output module 622, e.g., to display 215. In some embodiments, the stored captured images are retrieved from memory, e.g., memory 213, when needed for use in additional processing steps of method 500. Operation proceeds from step 512 to step 514.

In step 514, dirty lens determination module 604 of assembly of modules 600 makes a determination as to whether or not a dirty camera lens condition exists based on at least the first captured image. If it is determined that a dirty camera lens condition exists then operation proceeds to steps 534 and 536 shown on FIG. 5B via connection node A 532. If it is determined that a dirty camera lens condition does not exist then operation proceeds from step 514 to step 544 shown on FIG. 5B via connection node B 533.

In step 544, the composite image generation module 620 of assembly of modules 600 generates a composite image by combining images, e.g., two or more of the first, second, third, or Nth images. Operation proceeds from step 544 to step 546.

In some embodiments, dirty lens determination step 514 includes one or more optional sub-steps 516, 522, 526, and 528.

In some embodiments, the step of determining if a dirty camera lens condition exists 514 includes sub-steps 516 and 526. In such embodiments, in sub-step 516 comparison module 608 performs a first comparison by comparing the first image or a characteristic of the first image to the second image or a characteristic of the second image. Operation proceeds from sub-step 516 to decision sub-step 526. In decision sub-step 526, decision module 611 of assembly of modules 600 makes a decision as to whether said dirty camera lens condition exists based on the first comparison e.g., based on the result of the first comparison. If the decision module 611 determines based on the first comparison that a dirty camera lens condition exists then operation proceeds to steps 534 and step 536 shown on FIG. 5B via connection node A 532. If the decision module 611 determines based on the result of the first comparison that a dirty camera lens condition does not exist then operation proceeds to step 544 shown on FIG. 5B via connection node B 533.

In some embodiments, sub-step 516 includes step 518 wherein the first comparison performed by the comparison module 608 is a comparison of a first image metric corresponding to the first image and a second image metric corresponding to the second image wherein the first and second image metrics correspond to an overlapping image region. In some of such embodiments, decision sub-step 526 includes step 527 wherein making a decision as to whether said dirty camera lens condition exists based on the first comparison includes determining that a dirty camera lens condition exists when the first comparison indicates a difference in the first and second image metrics above a predetermined threshold. If the first comparison indicates the difference in the first and second image metrics are not above the predetermined threshold than it determined that a dirty camera lens condition does not exist. In some embodiments the first image metric is a contrast measure of the overlapping image region in the first image and the second image metric is a contrast measure of the overlapping region in the second image.

In some embodiments step 518 of sub-step 516 includes step 520. In step 520, an average image contrast of the first image is compared to the average image contrast of the second image.

In some embodiments, the step of determining if a dirty camera lens condition exists 514 includes sub-steps 516, 522, and 528. In such embodiments, sub-steps 516 and 522 may be performed sequentially or concurrently. The ordering in which the steps are performed is not important.

As previously described, in sub-step 516 comparison module 608 performs a first comparison by comparing the first image or a characteristic of the first image to the second image or a characteristic of the second image. Sub-step 516 may, and in some embodiments does, include step 518 as previously described. In turn step 518, may and in some embodiments does, include step 520. As described above, in step 520, an average image contrast of the first image is compared to the average image contrast of the second image.

In sub-step 522, comparison module 608 of assembly of modules 600 performs a second comparison by comparing the third image or a characteristic of the third image to another image or a characteristic of another image. In some embodiments, the another image is either the first image or the second image. In some embodiments, the another image is either the first image, the second image, or the Nth image.

In some embodiments sub-step 522 includes step 524, wherein the second comparison includes comparing an average image contrast of the third image to the average image contrast of the first image or the average image contrast of the second image.

Operation proceeds from sub-steps 516 and 522 to decision sub-step 528. In decision sub-step 528, decision module 611 makes a decision as to whether said dirty camera lens condition exists based on the first comparison and the second comparison. If the decision module 611 determines based on the first comparison and the second comparison that a dirty camera lens condition exists then operation proceeds to steps 534 and step 536 shown on FIG. 5B via connection node A 532. If the decision module 611 determines based on the first comparison and the second comparison that a dirty camera lens condition does not exist then operation proceeds to step 544 shown on FIG. 5B via connection node B 533.

In some embodiments, decision sub-step 528 includes the step 530. In step 530 the decision module 611 determines that a dirty lens condition exists when either the first comparison or the second comparison indicates a predetermined condition with respect to a threshold, e.g., when the difference between the first and second image metrics is above a predetermined condition threshold. If neither the first comparison nor the second comparison indicates a predetermined condition with respect to the predetermined condition threshold then the decision module 611 determines that a dirty lens condition does not exist. In some embodiments the predetermined condition threshold is the same as the predetermined threshold.

As previously described when it is determined or a decision is made in step 514 that a dirty lens condition exists operation proceeds to steps 534 and 536 shown on FIG. 5B via connection node A 532. Steps 534 and 536 may be, and in some embodiments are performed concurrently. In some embodiments the steps 534 and 536 may be performed sequentially. When steps 534 and 536 are performed sequentially the ordering of the processing of the steps 534 and 536 is not important.

In step 534 dirty lens notification module 614 notifies a user of the camera of the dirty lens condition, e.g., by generating a dirty lens condition notification, and/or initiates an automatic camera lens cleaning operation in response to determining that a dirty lens condition exists. In some embodiments, the camera includes an automatic cleaning mechanism that once initiated cleans the lenses of the camera. In some embodiments, the particular lens or lenses that are dirty are identified and a cleaning operation is initiated with respect to the identified one or more dirty lenses. In some embodiments, upon the identification of a dirty lens a camera cleaning module translates or causes to move the identified lens or an associated lens cover to clean or move to a different area on the lens, the dirt or other contamination on the identified dirty lens. For example, moving the dirt or contamination to a portion of the lens that has less effect or influence on the image or which is less important to the generation of a composite image. In some embodiments, one or more mirrors of the optical chain which contains the identified dirty lens are moved to reduce the effect of the dirt or contamination on the combined image which is generated from images captured using the dirty lens. For example, by moving the dirty lens, mirror or associated cover, the effects on the image may be minimized by having the affected area of the captured image be a portion of the image that is not used in generation of the composite image. In another example, by moving the dirty lens, mirror or associated cover, the effects on the image may be minimized by having the affected area of the captured image be a portion of the image that is not the object of interest being photographed but instead is a peripheral portion of the scene such as a background portion of the scene that may be blurred or replaced with similar background imagery during the generation of the composite image, e.g., one portion of the image showing grass replacing a portion of the image showing a fingerprint and grass.

In some embodiments generating a dirty lens condition notification to notify a user of the camera of that a dirty lens condition exists includes providing an audio or visual indication of the dirty lens condition. In some embodiments a camera warning indicator light or particular sound may and in some embodiments is used to indicate a dirty lens condition and optionally which lens in particular is dirty.

The dirty lens notification module 614 in some embodiments provides an audio indication of the dirty lens condition by providing a tone, e.g., a beep, or a set of tones or beeps when a dirty lens condition is detected. The audio indication may be, and in some embodiments is, an audio message in one or more languages. In some of such embodiments, the audio message may be, an English language audio message, stating that "camera lens is dirty." In another exemplary embodiment an audio message may be, and sometimes is an English language message, stating, "camera lens X is dirty lens" or "camera lenses X and Y are dirty" where X and Y identify lenses of the camera that have been detected as being dirty. In some embodiments, the audio message is a pre-recorded full length audio message stored in memory e.g., memory 213. In some embodiments the audio message is generated from a set of pre-recorded audio fragments stored in memory such as "camera lens", "camera lenses", "one", "two", "three", "four", "is", "are" "dirty". In some embodiments, the language of the pre-recorded audio message, e.g., English, French, Korean, Japanese, etc. is based upon a user selected language mode of the device such as the device 200, being placed in English mode of operation for display and audio messages. In some embodiments, the audio notification module 618 of dirty lens notification module 614 of assembly of modules 600 performs the operation of audibly notifying the user of a dirty lens condition.

The dirty lens notification module 614 in some embodiments provides a visual indication that a dirty lens condition exists by illuminating one or more lights, e.g., LEDs on the device including the dirty lens, e.g., the device 200. In some embodiments, a light may be, and is placed in a flashing mode when a dirty lens condition is detected. In some embodiments, light may be, and sometimes is, changed from a green color to a red color to indicate and notify the user of a dirty lens condition. In some embodiments, the device 200 includes a light corresponding to each lens of the camera and when one or more dirty lens are detected and identified each light corresponding to each of the identified dirty lenses is illuminated or placed in a state, such as flashing, to indicate that the corresponding lens has a dirty lens. In some embodiments, a visual indication of a dirty lens condition includes a message presented on the display of the device in one or more languages, e.g., on display 215 of device 200. The language of the display message may be set in a manner similar to that described above in connection with audio message that may be played to indicate a dirty lens condition. In some embodiments, a dirty lens condition may be indicated by presenting the user with a "Clean Lens X" message specifying to the user which of the plurality of lenses should be cleaned and thus making the user aware that the lens is dirty. Alternatively, a simple message saying "Dirty Lens Condition detected" or some other similar warning may be presented to the user, e.g. via a display on the camera. In some embodiments, the visual notification sub-module 616 of dirty lens notification module 614 of assembly of modules 600 performs the visual notification operation to alert the user of the dirty lens condition.

The dirty lens notification module 614 in some embodiments provides both a visual and audio indication that a dirty lens condition exists.

In some embodiments, in response to determining that a dirty lens condition exists the method 500 includes the additional steps of periodically testing to determine if said determined dirty lens condition has been rectified; and when said dirty lens condition has been rectified ceasing said notification being provided to the user of said dirty lens condition. For example, terminating a light that illuminated, stopping an audible alert, such as a beep or a tone, removing a display message from the display, etc. In some embodiments, the method further includes that when said dirty lens condition has been rectified providing an audio or visual indication to the user that said dirty lens condition has been rectified. For example, a different audible tone or set of tones or beeps than used to notify the user of a dirty lens condition, turning a light corresponding to a lens from one color to another such as from red signifying a dirty lens to green indicating a clean lens, an audio played by the device or visual message displayed on the display of the device wherein the messages states for example "Lens X has been cleaned" where X was the lens that had been identified as dirty or more generally, "Camera lenses clean".

In step 536, dirty lens determination module 604 associates dirty lens information with one or more images captured by a lens while the lens was determined to be dirty. Operation proceeds from step 536 to step 538.

In step 538, storage module 602 of assembly of modules 600 stores in memory, e.g., data/information section 221 of memory 213, information indicating which of the plurality of optical chains, e.g., first, second, third or Nth optical chain, includes a dirty lens. Operation proceeds from step 538 to step 540.

In step 540, processor 110 of device 100 or processor 211 of device 200 generates a composite image. In some embodiments, composite image generation module performs step 540. In step 540 a composite image is generated by combining images, e.g., the first image and the second image, and treating an image indicated as corresponding to a dirty lens differently than an image corresponding to a clean lens. In some embodiments, step 540 includes step 542 which includes excluding the image corresponding to a dirty lens from use in generating the composite image or giving a lower influence to the image corresponding to a dirty lens in the composite image generation process than an image corresponding to the dirty lens would be given if the image did not correspond to a dirty lens. Operation proceeds from step 540 to step 546.

As previously discussed, in those instances in which the determination step 514 determines that a dirty lens condition does not exist, operation proceeds from step 514 to step 544 shown in FIG. 5B via connection node B.

In step 544, the processor of the device, e.g., processor 211 of device 200 or processor 110 of device 100, or composite image generation module 620 of assembly of modules 600 generates a composite image by combining images, e.g., two or more of the first, second, third, or Nth images. Operation proceeds from step 544 to step 546.

In step 546, storage module 602 stores the generated composite image in memory, e.g., memory 213 of camera device 200 and/or output module 622 of assembly of module 600 outputs the composite image, e.g., to display 215 of camera device 200.

In some embodiments, the first comparison is performed by the first comparison module 610 included in the comparison module 608 of the assembly of modules. In some embodiments the second comparison is performed by the second comparison module 612 included in the comparison module 608 of the assembly of modules 600.

In some embodiments, the camera contains a cleaning mechanism or functionality to translate the lenses/mirrors/cover, of an optical chain containing a dirty outermost lens or cover to clean the dirt or other contamination or to move the dirt or other contamination to a less influential spot on the image, e.g. from an area of the image that is in focus to an area of the image that is less in focus.

The first comparison of the dirty lens detection method may, and in some embodiments does, use a process involving multi-view, and/or multi-zoom and/or multi-focus images. In some embodiments a criterion or criteria are used in determining a dirty lens condition. In some such embodiments, the criterion is a combination of factors. For example, the first comparison has a criteria indicating presence of dirt. Such criteria in some embodiments is a difference in contrast of an area of the image being below a threshold, or difference in local intensity of an area or the image being above or below a threshold, presence (above a threshold) of image spatial frequency components that do not conform with natural scene statistics indicating superposition of dust shadows, repeated irregularity in depth estimates, etc.

The first and/or second comparisons may be, and in some embodiments are, made with captured images taken as a user changes zoom or object focus distance, as well as from multi-views. Comparison of multiple images from the same optical chain across changing zoom/pointing or auto-focus may be, and in some embodiments is, used to identify dirt on the outermost lens of the optical chain.

In another embodiment of a method of operating a camera in accordance with the present invention, the method includes: capturing a first image using a first lens of the camera; determining, based on at least the first image, if a dirty camera lens condition exists; and in response to determining that a dirty lens condition exists, generating a dirty lens condition notification or initiating an automatic camera lens cleaning operation. In some of such embodiments the step of determining if a dirty camera lens condition exists includes: performing a first comparison of said first image or a characteristic of said first image to a second image or a characteristic of said second image; and making a decision as to whether said dirty camera lens condition exists based on said first comparison. In some embodiments, the first and first and second images were captured at the same time using outer lenses corresponding to two different camera modules. In some embodiments, the first and second images were captured at different times using the first lens.

It should be appreciated that various features and/or steps of method 500 relate to improvements in cameras and/or image processing even though such devices may use general purpose processors and/or image sensors. While one or more steps of the method 500, e.g., such as composite image generation step, have been discussed as being performed by a processor, e.g., processor 110, 211, it should be appreciated that one or more of the steps of the method 500 may be, and in some embodiments are, implemented by dedicated circuitry, e.g., ASICs, FPGAs and/or other application specific circuits which improve the efficiency, accuracy and/or operational capability of the imaging device performing the method. In some embodiments, dedicated hardware, e.g., circuitry, and/or the combination of dedicated hardware and software are utilized in implementing one or more steps of the method 500 therein providing additional image processing efficiency, accuracy and/or operational capability to the imaging device, e.g., camera, implementing the method.

While a logical sequencing of the processing steps of the exemplary embodiments of the methods, routines and subroutines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., a camera device. Various embodiments are also directed to methods, e.g., a method of processing images. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. A method of operating a device including a plurality of at least three optical chains, the method comprising:
   capturing a first image using a first lens of a first optical chain;
   capturing a second image using a second lens of a second optical chain;
   capturing a third image using a third lens of a third optical chain;
   performing a first comparison of said first image or a characteristic of said first image to the second image or a characteristic of said second image;
   performing a second comparison, said second comparison being a comparison of said third image or a characteristic of said third image to another image or a characteristic of said another image, said another image being either the first image or the second image;
   determining, based on at least one of said first and second comparisons, that a dirty camera lens condition exists, at least one of said first, second and third lenses having been determined to be dirty when said dirty camera lens condition exists, said at least one lens being a dirty lens;
   associating dirty lens information with an image captured using said dirty lens; and
   combining captured images to generate a composite image, the image captured using the dirty lens being treated differently during the image combining process used to generate the composite image than an image captured using a clean lens.

2. The method of claim 1, further comprising:
   in response to determining that a dirty lens condition exists, generating a dirty lens condition notification or initiating an automatic camera lens cleaning operation;
   wherein generating the dirty lens condition notification is performed in response to determining that the dirty lens condition exists; and
   wherein the generated dirty lens condition notification identifies a particular one of said first, second and third lenses being dirty.

3. The method of claim 1, wherein said first and second images were captured at the same time using outer lenses corresponding to the first and second optical chains, respectively.

4. The method of claim 2, wherein said generated dirty lens condition notification is an audio notification which informs a user of which particular lens or lenses have been determined to be dirty.

5. The method of claim 1,
   wherein said first comparison is a comparison of a first image metric corresponding to said first image and a second image metric corresponding to said second image, the first and second image metrics corresponding to an overlapping image region; and
   wherein determining that said dirty camera lens condition exists includes determining if a different in the first and second image metrics is above a predetermined threshold.

6. The method of claim 1, further comprising:
   moving a mirror in an optical chain determined to include a dirty lens to change which portion of a captured image is affected by dirt on the lens.

7. The method of claim 1, wherein capturing said first and second images includes operating said first and second optical chains at the same time to capture said first and second images, respectively.

8. A method, the method comprising:
   capturing a first image using a first lens of a first optical chain of a device including a plurality of different optical chains, said first optical chain including a first sensor;
   capturing a second image using a second lens of a second optical chain, said second optical chain including a second sensor;
   capturing a third image using a third lens of a third optical chain, said third optical chain including a third sensor;
   performing a first comparison of said first image or a characteristic of said first image to the second image or a characteristic of said second image;
   performing a second comparison, said second comparison being a comparison of said third image or a characteristic of said third image to another image or a characteristic of said another image, said another image being either the first image or the second image;
   making a decision as to whether said dirty camera lens condition exists based on said first comparison and said second comparison;
   storing information indicating which of the plurality of optical chains includes a dirty lens; and
   using dirty lens information as part of a composite image generation process, an image indicated to correspond to a dirty lens being treated differently during an image combining process performed during said composite image generation process than an image corresponding to a clean lens.

9. The method of claim 8, wherein said decision is a decision that said dirty camera lens condition exists when either said first comparison or said second comparison indicates a difference above a threshold.

10. The method of claim 9,
wherein said first comparison is a comparison of an average image contrast of said first image to an average image contrast of said second image; and
wherein said second comparison is a comparison of an average image contrast of said third image to the average image contrast of said first image or the average image contrast of said second image.

11. The method of claim 8, further comprising:
in response to determining that a dirty lens condition exists, generating a dirty lens condition notification or initiating an automatic camera lens cleaning operation.

12. The method of claim 11, wherein said device is a handheld camera including said first, second and third optical chains.

13. A system comprising:
a first optical chain including a first lens for capturing a first image;
a second optical chain including a second lens;
a third optical chain including a third lens; and
a dirty lens determination module configured to:
perform a first comparison of said first image or a characteristic of said first image to the second image or a characteristic of said second image;
perform a second comparison, said second comparison being a comparison of said third image or a characteristic of said third image to another image or a characteristic of said another image, said another image being either the first image or the second image;
determine, based on at least one of said first and second comparisons, that a dirty camera lens condition exists when one of the first, second or third lenses is a dirty lens; and
combine captured images to generate a composite image, an image captured using the dirty lens being treated differently during the image combining process used to generate the composite image than an image captured using a clean lens.

14. The system of claim 13, wherein said dirty lens determination module includes a comparison module configured to, as part of said determining if a dirty camera lens condition exists, perform a first comparison of said first image or a characteristic of said first image to a second image or a characteristic of said second image; and
a decision module configured to, as part of said determining if dirty camera lens condition exists, make a decision as to whether said dirty camera lens condition exists based on the results of said first comparison.

15. The system of claim 14,
wherein said first comparison is a comparison of a first image metric corresponding to said first image and a second image metric corresponding to said second image, the first and second image metrics corresponding to an overlapping image region; and
wherein determining, based on at least one of said first and second comparisons, if the dirty camera lens condition exists includes determining that a dirty camera lens exists when the first comparison indicates a difference in the first and second image metrics above a predetermined threshold.

16. The system of claim 14,
wherein said first lens is an outer most lens of the first optical chain, the outermost lens being the lens furthest from a sensor in the first optical chain.

17. The system of claim 15, further including a memory storing information identifying which particular lens or lenses have been determined to be dirty.

18. The device of claim 14, wherein said decision is a decision that said dirty camera lens condition exists when either said first comparison or said second comparison indicates a difference above a threshold.

19. The system of claim 14,
wherein said first comparison is a comparison of an average image contrast of said first image to an average image contrast of said second image; and
wherein said second comparison is a comparison of an average image contrast of said third image to the average image contrast of said first image or the average image contrast of said second image.

20. A non-transitory computer readable medium comprising computer executable instructions, said non-transitory computer readable medium comprising:
instructions, which when executed by a processor, cause the processor to:
control a first optical chain having an outermost lens to capture a first image;
control a second optical chain including a second outermost lens to capture a second image;
control a third optical chain including a third outermost lens to capture a third image;
perform a first comparison of said first image or a characteristic of said first image to the second image or a characteristic of said second image;
perform a second comparison, said second comparison being a comparison of said third image or a characteristic of said third image to another image or a characteristic of said another image, said another image being either the first image or the second image;
determine, based on at least one of said first and second comparisons, that a dirty camera lens condition exists, at least one of said first, second and third lenses having been determined to be dirty when said dirty camera lens condition exists, said at least one lens being a dirty lens;
associate dirty lens information with an image captured using said dirty lens; and
combine captured images to generate a composite image, the image captured using the dirty lens being treated differently during the image combining process used to generate the composite image than an image captured using a clean lens.

* * * * *